(12) United States Patent
Takahashi et al.

(10) Patent No.: US 10,951,945 B2
(45) Date of Patent: Mar. 16, 2021

(54) DATA PROCESSING APPARATUS AND DATA PROCESSING METHOD

(71) Applicant: SATURN LICENSING LLC, New York, NY (US)

(72) Inventors: Kazuyuki Takahashi, Chiba (JP); Lachlan Bruce Michael, Saitama (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/781,203

(22) PCT Filed: Dec. 28, 2016

(86) PCT No.: PCT/JP2016/089039
§ 371 (c)(1),
(2) Date: Jun. 4, 2018

(87) PCT Pub. No.: WO2017/122544
PCT Pub. Date: Jul. 20, 2017

(65) Prior Publication Data
US 2018/0359520 A1    Dec. 13, 2018

(30) Foreign Application Priority Data

Jan. 13, 2016  (JP) .............................. JP2016-004533

(51) Int. Cl.
*H04N 21/438*    (2011.01)
*H04H 60/32*    (2008.01)
(Continued)

(52) U.S. Cl.
CPC ........ *H04N 21/4382* (2013.01); *H04H 60/32* (2013.01); *H04N 21/435* (2013.01); *H04N 21/438* (2013.01); *H04N 21/4385* (2013.01)

(58) Field of Classification Search
CPC .................................................. H04N 5/4401
See application file for complete search history.

(56) References Cited

U.S. PATENT DOCUMENTS

| | | | | |
|---|---|---|---|---|
| 7,705,920 | B2 * | 4/2010 | Lee ...................... | H04N 5/4401 348/725 |
| 7,982,808 | B2 * | 7/2011 | Lee ...................... | H04N 5/4401 348/725 |

(Continued)

FOREIGN PATENT DOCUMENTS

| | | |
|---|---|---|
| JP | 2000-134168 A | 5/2000 |
| JP | 2005-340905 A | 12/2005 |

OTHER PUBLICATIONS

Extended European Search Report dated Oct. 30, 2018 in Patent Application No. 16885144.2, 10 pages.

(Continued)

*Primary Examiner* — Paulos M Natnael
(74) *Attorney, Agent, or Firm* — Oblon, McClelland, Maier & Neustadt, L.L.P.

(57) ABSTRACT

The present technology relates to a data processing apparatus and a data processing method that permit enhancement of functional extensibility of apparatuses on a receiving side. A data processing apparatus at a preceding stage receives a digital broadcast signal, processes, of data acquired by a demodulation process of the digital broadcast signal, notification data to be notified to a data processing apparatus at a succeeding stage that performs a process succeeding to the demodulation process, transforms the notification data into a transportable format together with reception data acquired from the digital broadcast signal, and outputs the notification data to the data processing apparatus at the succeeding stage together with the reception data. The present technology is applicable, for example, to a system that includes a demodulation device and a system-on-chip.

17 Claims, 38 Drawing Sheets

(51) Int. Cl.
*H04N 21/435* (2011.01)
*H04N 21/4385* (2011.01)

(56) References Cited

U.S. PATENT DOCUMENTS

| | | | | |
|---|---|---|---|---|
| 8,314,891 | B2* | 11/2012 | Lee | H04N 5/4401 348/723 |
| 9,215,393 | B2* | 12/2015 | Voth | G06F 3/017 |
| 9,258,541 | B2* | 2/2016 | Choe | H04N 5/44591 |
| 10,091,486 | B2* | 10/2018 | Choe | H04N 5/44591 |
| 2001/0056576 | A1* | 12/2001 | Park | H04N 7/163 725/48 |
| 2006/0150231 | A1 | 7/2006 | Kim et al. | |
| 2008/0005767 | A1* | 1/2008 | Seo | H04N 21/4316 725/62 |
| 2010/0218215 | A1 | 8/2010 | Kim et al. | |
| 2010/0218216 | A1 | 8/2010 | Kim et al. | |
| 2010/0218217 | A1 | 8/2010 | Kim et al. | |
| 2010/0218218 | A1 | 8/2010 | Kim et al. | |
| 2010/0218219 | A1 | 8/2010 | Kim et al. | |
| 2010/0218220 | A1 | 8/2010 | Kim et al. | |
| 2010/0218221 | A1 | 8/2010 | Kim et al. | |
| 2010/0218222 | A1 | 8/2010 | Kim et al. | |
| 2010/0266130 | A1* | 10/2010 | Lin | H04L 9/0819 380/279 |
| 2011/0239254 | A1 | 9/2011 | Kim et al. | |
| 2012/0140123 | A1 | 6/2012 | Kim et al. | |
| 2012/0144446 | A1 | 6/2012 | Kim et al. | |
| 2012/0144447 | A1 | 6/2012 | Kim et al. | |
| 2013/0010203 | A1 | 1/2013 | Kim et al. | |
| 2013/0014175 | A1 | 1/2013 | Kim et al. | |
| 2013/0014176 | A1 | 1/2013 | Kim et al. | |
| 2013/0014178 | A1 | 1/2013 | Kim et al. | |
| 2013/0058359 | A1* | 3/2013 | Jeong | H04H 60/07 370/465 |
| 2013/0205346 | A1 | 8/2013 | Kim et al. | |
| 2013/0212626 | A1 | 8/2013 | Kim et al. | |
| 2013/0212627 | A1 | 8/2013 | Kim et al. | |
| 2013/0212628 | A1 | 8/2013 | Kim et al. | |
| 2013/0219432 | A1 | 8/2013 | Kim et al. | |
| 2013/0227613 | A1 | 8/2013 | Kim et al. | |
| 2013/0291021 | A1 | 10/2013 | Kim et al. | |
| 2013/0291047 | A1 | 10/2013 | Kim et al. | |
| 2013/0291048 | A1 | 10/2013 | Kim et al. | |
| 2013/0294277 | A1* | 11/2013 | Nagata | H04L 5/0048 370/252 |
| 2013/0298167 | A1 | 11/2013 | Kim et al. | |
| 2014/0036759 | A1* | 2/2014 | Jeong | H04W 4/06 370/312 |
| 2014/0109146 | A1 | 4/2014 | Kim et al. | |
| 2014/0109147 | A1 | 4/2014 | Kim et al. | |
| 2014/0109148 | A1 | 4/2014 | Kim et al. | |
| 2014/0109149 | A1 | 4/2014 | Kim et al. | |
| 2014/0109150 | A1 | 4/2014 | Kim et al. | |
| 2014/0109151 | A1 | 4/2014 | Kim et al. | |
| 2014/0300823 | A1 | 10/2014 | Kim et al. | |
| 2014/0304742 | A1 | 10/2014 | Kim et al. | |
| 2014/0304743 | A1 | 10/2014 | Kim et al. | |
| 2014/0304744 | A1 | 10/2014 | Kim et al. | |
| 2014/0304746 | A1 | 10/2014 | Kim et al. | |
| 2014/0304747 | A1 | 10/2014 | Kim et al. | |
| 2014/0304748 | A1 | 10/2014 | Kim et al. | |
| 2015/0020113 | A1 | 1/2015 | Kim et al. | |
| 2015/0020115 | A1 | 1/2015 | Kim et al. | |
| 2015/0020117 | A1 | 1/2015 | Kim et al. | |
| 2015/0020118 | A1 | 1/2015 | Kim et al. | |
| 2015/0020141 | A1 | 1/2015 | Kim et al. | |
| 2015/0020144 | A1 | 1/2015 | Kim et al. | |
| 2015/0020145 | A1 | 1/2015 | Kim et al. | |
| 2015/0052563 | A1 | 2/2015 | Kim et al. | |
| 2015/0135232 | A1 | 5/2015 | Kim et al. | |
| 2015/0135233 | A1 | 5/2015 | Kim et al. | |
| 2015/0143427 | A1 | 5/2015 | Kim et al. | |
| 2015/0150056 | A1 | 5/2015 | Kim et al. | |
| 2015/0172751 | A1 | 6/2015 | Kim et al. | |
| 2015/0172752 | A1 | 6/2015 | Kim et al. | |
| 2015/0212810 | A1* | 7/2015 | Lu | G06F 9/542 717/168 |
| 2015/0215384 | A1* | 7/2015 | Bannai | H04L 41/0813 709/201 |
| 2015/0334449 | A1 | 11/2015 | Kim et al. | |
| 2015/0334450 | A1 | 11/2015 | Kim et al. | |
| 2015/0334451 | A1 | 11/2015 | Kim et al. | |
| 2015/0334452 | A1 | 11/2015 | Kim et al. | |
| 2015/0334453 | A1 | 11/2015 | Kim et al. | |
| 2015/0334454 | A1 | 11/2015 | Kim et al. | |
| 2016/0316257 | A1 | 10/2016 | Kim et al. | |
| 2017/0150205 | A1 | 5/2017 | Kim et al. | |

OTHER PUBLICATIONS

"ATSC Candidate Standard: Physical Layer Protocol", Advanced Television Systems Committee, Doc. S32-230r21, Sep. 28, 2015, pp. ii-xiii and 14-228 (with cover page).

"Digital Video Broadcasting (DVB); Frame structure channel coding and modulation for a second generation digital terrestrial television broadcasting system (DVB-T2)", Final draft ETSI EN 302 755 V1.3.1, Nov. 2011, pp. 2-189 (with cover page).

* cited by examiner

FIG. 4

EXAMPLE OF PRIVATE USER DATA

| DATA_ID | DATA |
|---|---|
| 0x00 | TUNING FREQUENCY |
| 0x01 | PLP_ID |
| 0x02 | AGC_OK |
| 0x03 | Bootstrap_OK |
| 0x04 | Preamble_OK |
| 0x05 | Demod_OK |
| 0x06 | Time_Info(PTP, UTC,...) |
| 0x07 | TRL_OK(Time Recovery Loop) |
| 0x08 | CRL_OK(Carrier Recovery Loop) |
| 0x09 | PHY_OK |
| 0x0a | L1_Basic_OK |
| 0x0b | L1_Detail_OK |
| 0x0c | AGC_OK_Time |
| 0x0d | Bootstrap_OK_Time |
| 0x0d | L1_Basic_OK_Time |
| 0x0e | L1_Detail_OK_Time |
| 0x0f | AGC_Level |

| DATA_ID | DATA |
|---|---|
| 0x10 | Bootstrap_Max_Correlation |
| 0x11 | Bootstrap_Pack_Ratio |
| 0x12 | Sampling_Frequency_Offset(ppm) |
| 0x13 | Carrier_Frequency_Offset(kHz) |
| 0x14 | LDPC_Number_Iteration |
| 0x15 | BCH_Error |
| 0x16 | CRC_Error |
| 0x17 | MER(Modulation Error Ratio) |
| 0x18 | SNR(Instantaneous) |
| 0x19 | SNR(Average) |
| 0x1a | SNR(Max) |
| 0x1b | SNR(Min) |
| 0x1c | Error_Indicator |
| 0x1e | Bit Error Rate |
| 0x1f | Emergency_Information |
| 0x20 | Frame_Error_Rate |
| 0x21 | Packet_Error_Rate |
| 0x22 | DEMODULATION DEVICE MANUFACTURER'S ID |
| 0x23 | MANUFACTURER VERSION |
| 0x24-0x3f | Reserved |

| DATA_ID | DATA |
|---|---|
| 0x40 | Bootstrap |
| ... | ... |
| 0x60 | L1_Basic_signaling |
| ... | ... |
| 0x90 | L1_Detail_signaling |
| 0xd0-0xdf | Reserved for device vendor use |
| 0xf0-0xff | Reserved for future use |

FIG. 6

| Syntax | No. of Bits | Format |
|---|---|---|
| bootstrap_symbol_1 () { | | |
| eas_wake_up | 1 | uimsbf |
| system_bandwidth | 2 | uimsbf |
| min_time_to_next | 5 | uimsbf |
| } | | |

Signaling Fields for Bootstrap Symbol 1

FIG. 7

| Signaling Fields for Bootstrap Symbol 2 | | |
|---|---|---|
| Syntax | No. of Bits | Format |
| bootstrap_symbol_2() { | | |
| bsr_coefficient | 7 | uimsbf |
| } | | |

FIG. 8

| Signaling Fields for Bootstrap Symbol 3 | | |
|---|---|---|
| Syntax | No. of Bits | Format |
| bootstrap_symbol_301 preamble_structure | 7 | uimsbf |
| } | | |

FIG. 9

L1-Basic signaling fields and syntax

| Syntax | # of bits | format |
|---|---|---|
| L1_Basic_signaling() { | | |
|     L1B_content_tag | 2 | uimsbf |
|     L1B_version | 3 | uimsbf |
|     L1B_slt_flag | 1 | uimsbf |
|     L1B_time_info_flag | 1 | uimsbf |
| | | |
|     L1B_papr | 2 | uimsbf |
|     L1B_frame_length_mode | 1 | uimsbf |
|     L1B_frame_length | 10 | uimsbf |
|     L1B_num_subframes | 8 | uimsbf |
| | | |
|     L1B_preamble_num_symbols | 3 | uimsbf |
|     L1B_preamble_reduced_carriers | 3 | uimsbf |
|     L1B_L1_Detail_size_bits | 16 | uimsbf |
|     L1B_L1_Detail_fec_type | 3 | uimsbf |
|     L1B_L1_Detail_additional_parity_mode | 2 | uimsbf |
|     L1B_L1_Detail_total_cells | 19 | uimsbf |
| | | |
|     L1B_First_Sub_mimo | 1 | uimsbf |
|     L1B_First_Sub_miso | 1 | uimsbf |
|     L1B_First_Sub_fft_size | 2 | uimsbf |
|     L1B_First_Sub_reduced_carriers | 3 | uimsbf |
|     L1B_First_Sub_guard_interval | 4 | uimsbf |
|     L1B_First_Sub_excess_samples | 13 | uimsbf |
|     L1B_First_Sub_num_ofdm_symbols | 11 | uimsbf |
|     L1B_First_Sub_scattered_pilot_pattern | 5 | uimsbf |
|     L1B_First_Sub_scattered_pilot_boost | 3 | uimsbf |
|     L1B_First_Sub_sbs_first | 1 | uimsbf |
|     L1B_First_Sub_sbs_last | 1 | uimsbf |
|     L1B_Reserved | TBD | uimsbf |
|     L1B_crc | 32 | uimsbf |
| } | | |

FIG. 10

L1-Detail signaling fields and syntax

| Syntax | # of bits | format |
|---|---|---|
| L1_Detail_signaling() { | | |
| L1D_version | 4 | uimsbf |
| L1D_num_rf | 3 | uimsbf |
| for L1D_rf_id=1 .. L1D_num_rf{ | | |
| L1D_rf_frequency | 19 | uimsbf |
| } | | |
| if(L1B_time_info_flag=1){ | | |
| L1D_time_info | TBD | |
| } | | |
| for i=0 .. L1B_num_subframes{ | | |
| if(i>0){ | | |
| L1D_mimo | 1 | uimsbf |
| L1D_miso | 1 | uimsbf |
| L1D_fft_size | 2 | uimsbf |
| L1D_reduced_carriers | 3 | uimsbf |
| L1D_guard_interval | 4 | uimsbf |
| L1D_num_ofdm_symbols | 11 | uimsbf |
| L1D_scattered_pilot_pattern | 5 | uimsbf |
| L1D_scattered_pilot_boost | 3 | uimsbf |
| L1D_sbs_first | 1 | uimsbf |
| L1D_sbs_last | 1 | uimsbf |
| } | | |
| if(L1B_num_subframes>0){ | | |
| L1D_subframe_multiplex | 1 | uimsbf |
| } | | |
| L1D_frequency_interleaver | 1 | uimsbf |

| Syntax | # of bits | format |
|---|---|---|
| L1D_num_plp | 6 | uimsbf |
|  |  |  |
| for j=0..L1D_num_plp{ |  |  |
| L1D_plp_id | 6 | uimsbf |
| L1D_plp_slt_exist | 1 | uimsbf |
| L1D_plp_layer | 2 | uimsbf |
| L1D_plp_start | 24 | uimsbf |
| L1D_plp_size | 24 | uimsbf |
| L1D_plp_scrambler_type | 2 | uimsbf |
| L1D_plp_fec_type | 4 | uimsbf |
| if(L1D_plp_fec_type=={0,1,2,3,4,5}){ |  |  |
| L1D_plp_mod | 4 | uimsbf |
| L1D_plp_cod | 4 | uimsbf |
| } |  |  |
| L1D_plp_TI_mode | 2 | uimsbf |
|  |  |  |
| if(L1D_plp_TI_mode=01){ |  |  |
| L1D_CTI_fecframe_start | 21 | uimsbf |
| } |  |  |
|  |  |  |
| if(L1D_num_rf>0){ |  |  |
| L1D_plp_num_channel_bonded | 3 | uimsbf |
| if(L1D_plp_num_channel_bonded>0){ |  |  |
| L1D_plp_channel_bonding_format | 2 | uimsbf |
| for k=0..L1D_plp_num_channel_bonded{ |  |  |
| L1D_plp_bonded_rf_id | 3 | uimsbf |
| } |  |  |
| } |  |  |
| } |  |  |
|  |  |  |
| if(j=0 && L1B_First_Sub_mimo=1)||(j>1 && L1B_mimo=1){ |  |  |
| L1D_plp_stream_combining | 1 | uimsbf |
| L1D_plp_IQ_interleaving | 1 | uimsbf |
| L1D_plp_PH | 1 | uimsbf |
| } |  |  |
|  |  |  |
| if(L1D_plp_layer=0){ |  |  |
|  |  |  |
| L1D_plp_type | 1 | uimsbf |
| if L1D_plp_type=1{ |  |  |
| L1D_num_subslices | 14 | uimsbf |
| L1D_subslice_interval | 24 | uimsbf |
| } |  |  |
|  |  |  |
| L1D_plp_TI_extended_interleaving | 1 | uimsbf |

| Syntax | # of bits | format |
|---|---|---|
| L1D_CTI_depth | 3 | uimsbf |
| if(L1D_plp_TI_mode=01){ | | |
| L1D_CTI_start_row | 10 | uimsbf |
| } | | |
| else{ | | |
| L1D_HTI_inter_subframe | 1 | uimsbf |
| L1D_HTI_num_ti_blocks | 4 | uimsbf |
| L1D_HTI_num_fec_blocks_max | 12 | uimsbf |
| for k=0..L1D_HTI_num_ti_blocks{ | | |
| L1D_HTI_num_fec_blocks | 12 | uimsbf |
| } | | |
| L1D_HTI_cell_interleaver | 1 | uimsbf |
| } | | |
| } | | |
| else{ | | |
| L1D_ldm_injection_level | 4 | uimsbf |
| } | | |
| } | | |
| } | | |
| L1D_Reserved | TBD | uimsbf |
| L1D_crc | 32 | uimsbf |
| } | | |

F I G . 1 5

(A) Generic PACKET ADDITIONAL HEADER TRANSPORT SCHEME

| Additional Header Index | DATA_ID | DATA |
|---|---|---|

EXAMPLE OF Additional Header Index:
000000:Private User Data

| DATA_ID | DATA |
|---|---|
| 0x00 | TUNING FREQUENCY |
| 0x01 | PLP_ID |
| 0x02 | AGC_OK |
| 0x03 | Bootstrap_OK |
| 0x04 | Preamble_OK |
| 0x05 | Demod_OK |
| 0x06 | Time_Info(PTP,UTC,...) |
| ... | ... |
| 0x60 | L1_Basic_signaling |
| ... | ... |
| 0x90 | L1_Detail_signaling |
| ... | ... |
| 0xd0-0xdf | Reserved for device vendor use |
| 0xf0-0xff | Reserved for future use |

FIG. 17

(C) L2 SIGNALING TRANSPORT SCHEME

| Syntax | No of Bits | Mnemonic | Semantics |
|---|---|---|---|
| Private_User_data_signaling() { | | | |
| signaling_type | 8 | uimsbf(0xff) | |
| NUM_DATA | 8 | bslbf | DATA COUNT |
| for(i=0;i<NUM_DATA;i++) { | | | |
| DATA_ID | 8 | bslbf | DATA ID |
| DATA_LENGTH | 8 | bslbf | DATA LENGTH |
| for(j=0;j<DATA_LENGTH;j++) { | | | |
| DATA[i][j] | 8 | bslbf | |
| } | | | |
| } | | | |

FIG. 22

(D) BB PACKET ADDITIONAL HEADER TRANSPORT SCHEME

| BBP Extension Header Index | DATA_ID | DATA |
|---|---|---|

EXAMPLE OF BBP Extension Header Index:
000000:Private User Data

| DATA_ID | DATA |
|---|---|
| 0x00 | TUNING FREQUENCY |
| 0x01 | PLP_ID |
| 0x02 | AGC_OK |
| 0x03 | Bootstrap_OK |
| 0x04 | Preamble_OK |
| 0x05 | Demod_OK |
| 0x06 | Time_Info(PTP,UTC,...) |
| ... | ... |
| 0x60 | L1_Basic_signaling |
| ... | ... |
| 0x90 | L1_Detail_signaling |
| 0xd0-0xdf | Reserved for device vendor use |
| 0xf0-0xff | Reserved for future use |

FIG. 24
(E) Generic PACKET EXTERNAL STRUCTURE SCHEME 1
A Generic PACKET
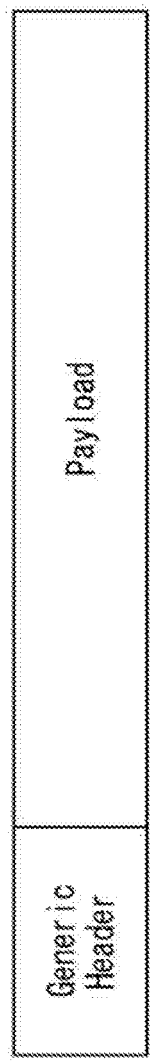
B ADD PRIVATE USER DATA OUTSIDE Generic PACKET

FIG. 25

(E) Generic PACKET EXTERNAL STRUCTURE SCHEME 1

| Syntax | No. of Bits | Mnemonic | Semantics |
|---|---|---|---|
| Private_User_Data1 { | | | |
| Packet_type | 3 | bslbf | "101" |
| PC | 1 | bslbf | 1 |
| HM | 1 | bslbf | |
| Length | 11 | uimsbf | PACKET LENGTH |
| NUM_DATA | 8 | bslbf | DATA COUNT |
| for (i=0;i<NUM_DATA;i++) { | | | |
| DATA_ID[i] | 8 | bslbf | DATA ID |
| DATA_LENGTH[i] | 8 | bslbf | DATA LENGTH |
| for (j=0;j<DATA_LENGTH[i];j++) | | | |
| DATA[i][j] | 8 | bslbf | |
| } | | | |
| } | | | |

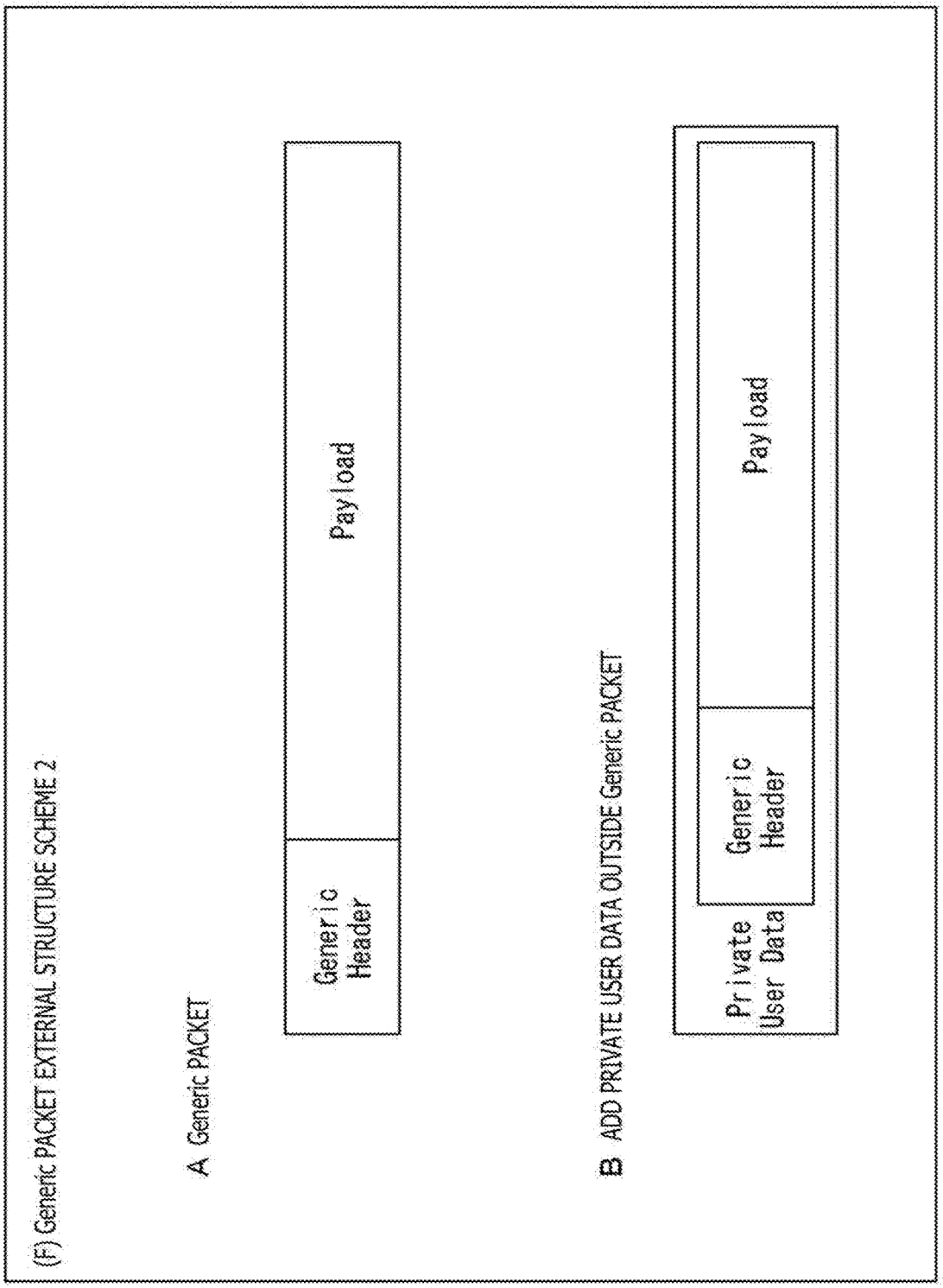

FIG. 28

(F) Generic PACKET EXTERNAL STRUCTURE SCHEME 2

| Syntax | No of Bits | Mnemonic | Semantics |
|---|---|---|---|
| Private_User_Data{ | | | |
| Packet_type | 3 | bslbf | "101" |
| PC | 1 | bslbf | Payload configuration |
| HM | 1 | bslbf | Header mode |
| Length | 1 | uimsbf | PACKET LENGTH |
| NUM_DATA | 8 | bslbf | DATA COUNT |
| for (i=0;i<NUM_DATA;i++) { | | | |
| DATA_ID[i] | 8 | bslbf | DATA ID |
| DATA_LENGTH[i] | 8 | bslbf | DATA LENGTH |
| for (j=0;j<DATA_LENGTH[i];j++) { | | | |
| DATA[i][j] | 8 | bslbf | Private user data |
| } | | | |
| for (j=0;j<(original_Length);j++) | | | |
| Generic_Packet_Payload[j] | 8 | bslbf | Generic Packet |
| } | | | |

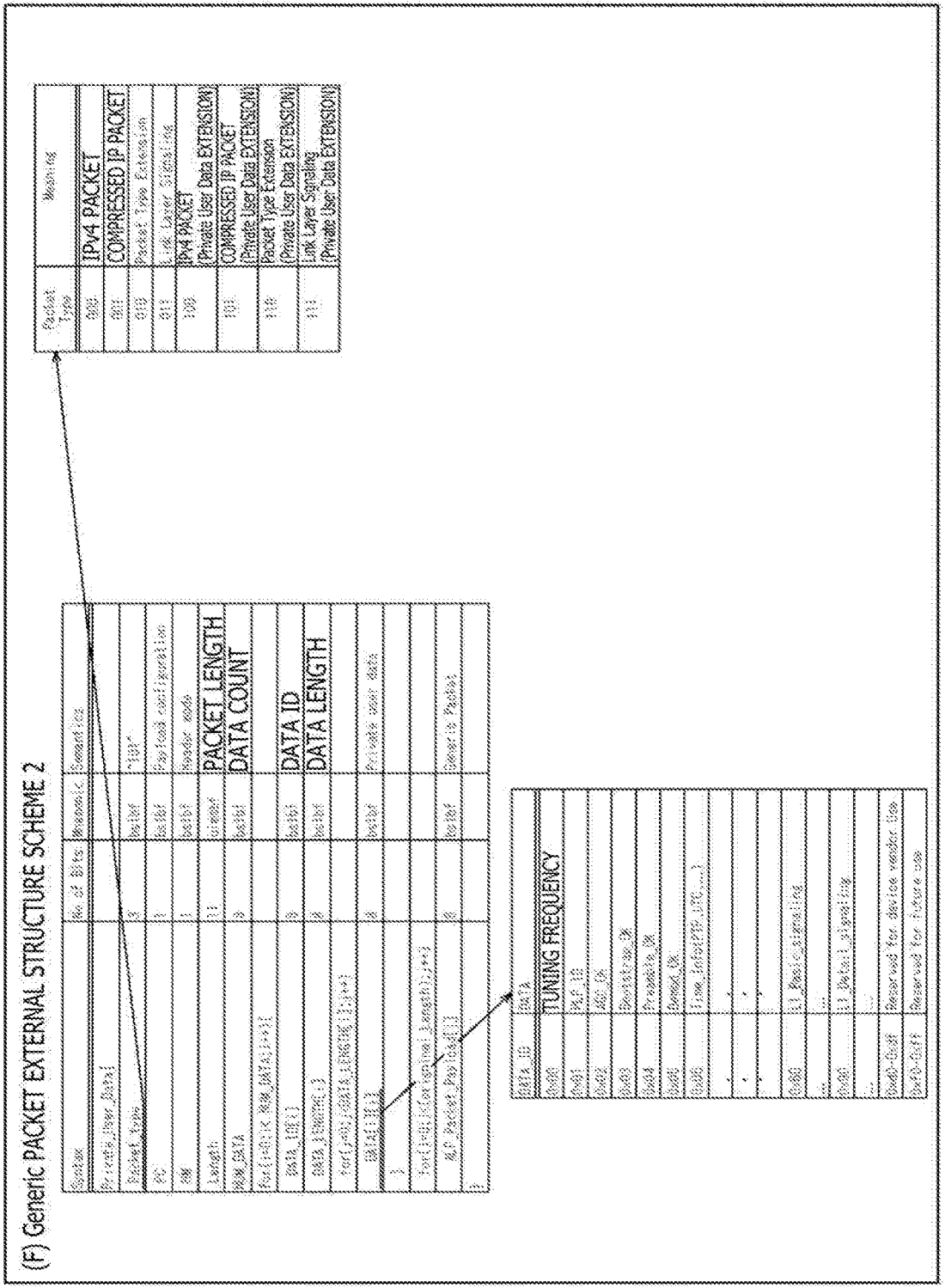

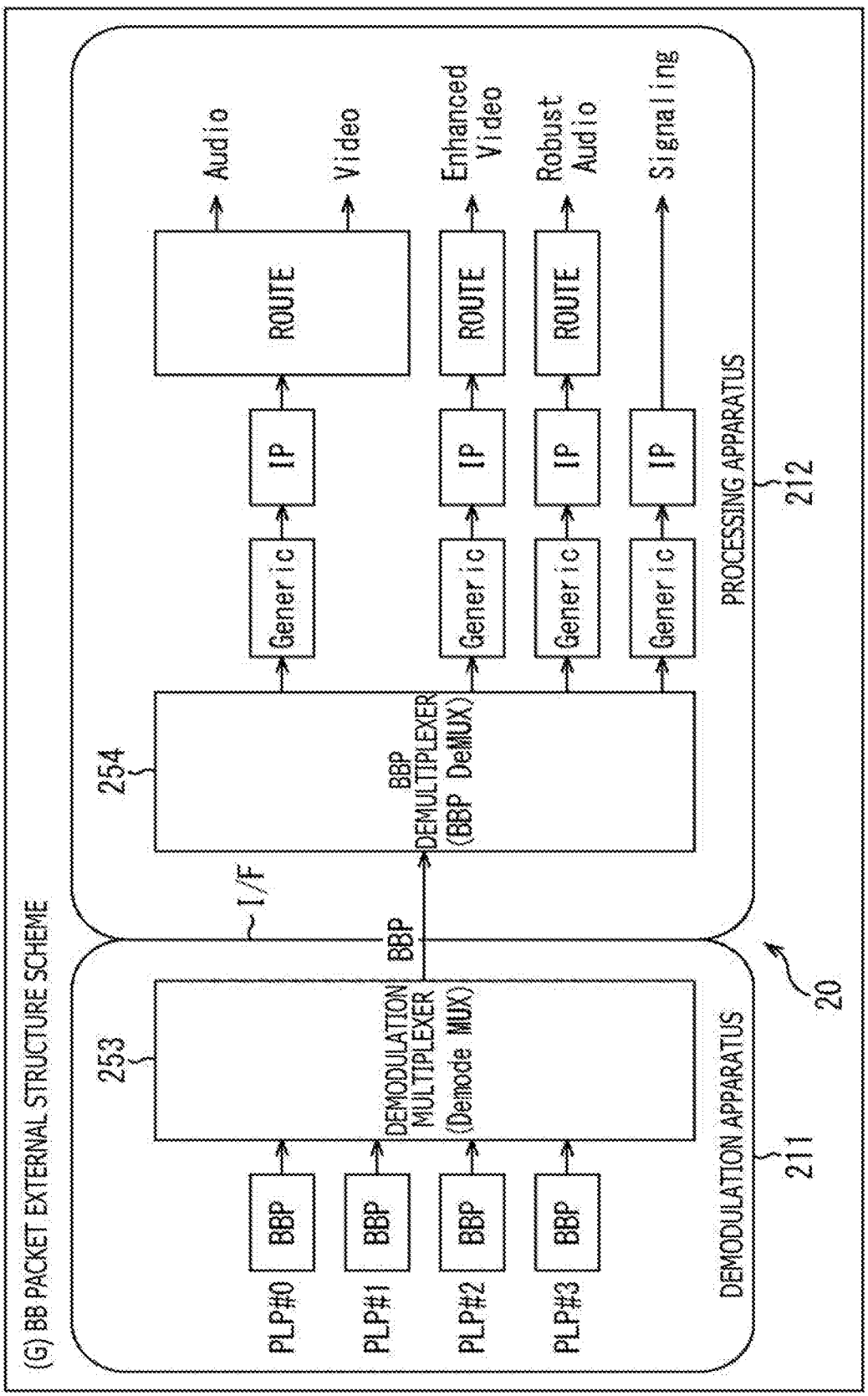

FIG. 31
(G) BB PACKET EXTERNAL STRUCTURE SCHEME
A BB PACKET
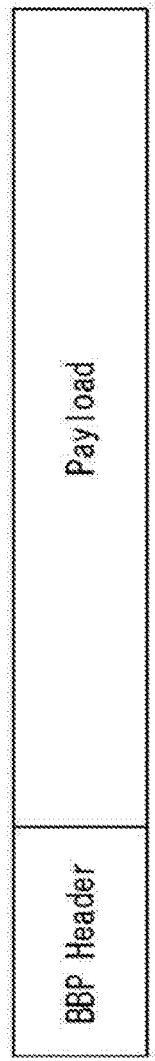
B ADD PRIVATE USER DATA OUTSIDE BB PACKET

(G) BB PACKET EXTERNAL STRUCTURE SCHEME

| BBP Extension Header Index | DATA_ID | DATA |

EXAMPLE OF BBP Extension Header Index:
000000: Private User Data

| DATA_ID | DATA |
|---|---|
| 0x00 | TUNING FREQUENCY |
| 0x01 | PLP_ID |
| 0x02 | AGC_OK |
| 0x03 | Bootstrap_OK |
| 0x04 | Preamble_OK |
| 0x05 | Demod_OK |
| 0x06 | Time_Info(PTP,UTC,...) |
| * | * |
| * | * |
| * | * |
| 0x60 | L1_Basic_signaling |
| ... | ... |
| 0x90 | L1_Detail_signaling |
| ... | ... |
| 0xd0-0xdf | Reserved for device vendor use |
| 0xf0-0xff | Reserved for future use |

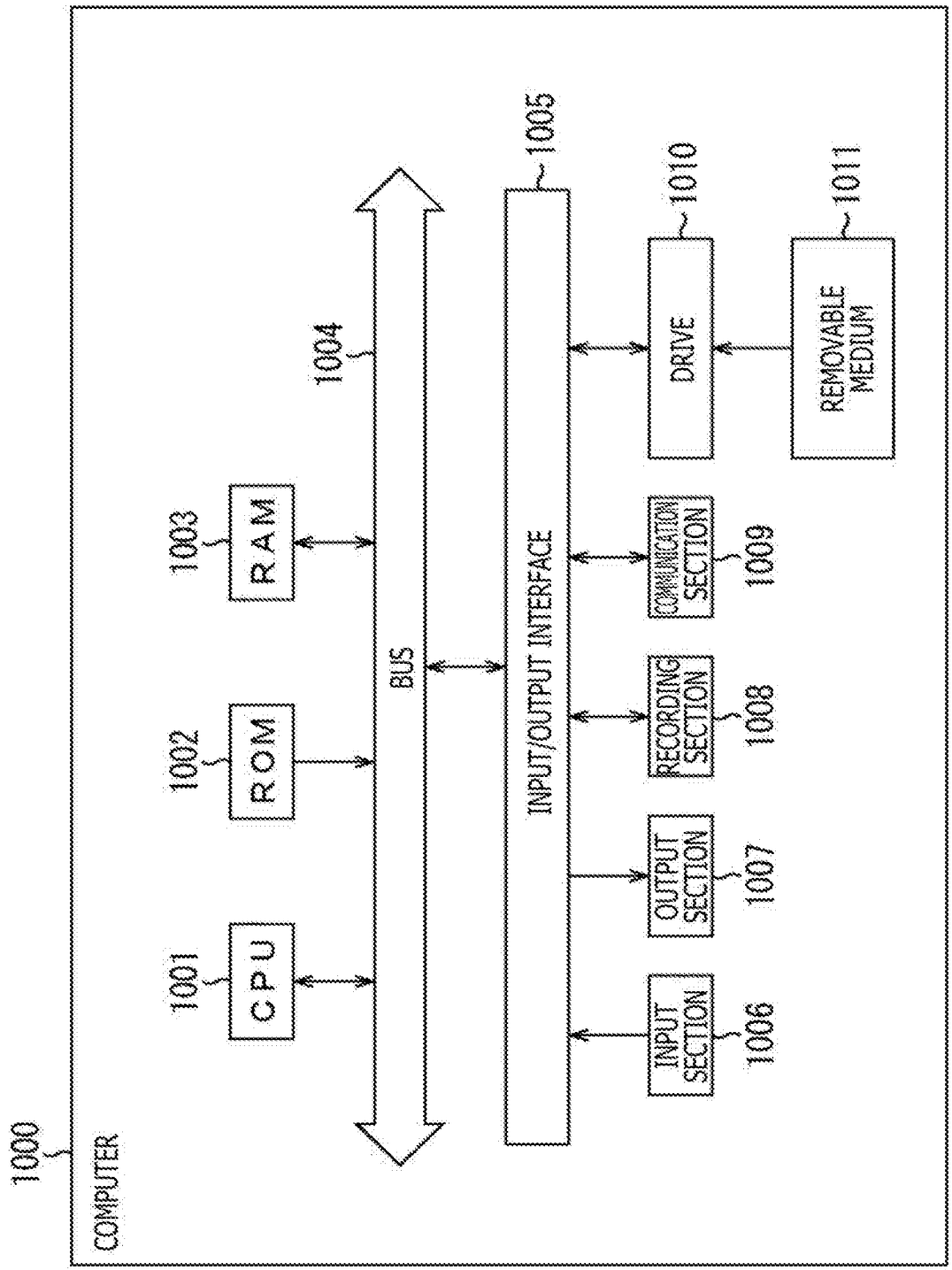

DATA PROCESSING APPARATUS AND DATA PROCESSING METHOD

TECHNICAL FIELD

The present technology relates to a data processing apparatus and a data processing method, and particularly to a data processing apparatus and a data processing method that permit enhancement of functional extensibility of apparatuses on a receiving side.

BACKGROUND ART

The development of ATSC (Advanced Television Systems Committee) 3.0, one of next generations of terrestrial broadcasting standard, is underway at present (refer, for example, to NPL 1).

It has been decided that ATSC 3.0 will adopt a scheme that mainly uses an IP/UDP packet, i.e., an IP (Internet Protocol) packet that includes a UDP (User Datagram Protocol) packet (hereinafter referred to as an IP transport scheme), rather than a TS (Transport Stream) packet for data transport. There are also expectations that the IP transport scheme will be used in the future not only in ATSC 3.0 but also in other broadcasting schemes.

Also, in M-PLP (Multiple PLP) scheme prescribed in DVB-T2 (Digital Video Broadcasting-Second Generation Terrestrial), what lies between a circuit at a preceding stage that performs a transport stream (TS) restoration process and a circuit at a succeeding stage that performs a process such as decoding on a receiving side is implemented by a single interface (refer, for example, to NPL 2).

CITATION LIST

Patent Literature

[NPL 1]
ATSC Candidate Standard: Physical Layer Protocol (Doc. S32-230r21 28 Sep. 2015)
[NPL 2]
ETSI EN 302 755 V1.3.1 (2011-11)

SUMMARY

Technical Problem

Incidentally, even in the case where an IP transport scheme is adopted, a single interface is desirable between a demodulation device (demodulation LSI) and a system-on-chip (SoC) at a succeeding stage thereof on a receiving side from a cost perspective as with DVB-T2.

On the other hand, when apparatuses (circuits) on the receiving side such as the demodulation device (demodulation LSI) and the system-on-chip (SoC) are connected by a single interface, proposals have been requested to allow notification of data to be notified from an apparatus (circuit) on a preceding stage to an apparatus (circuit) on a succeeding stage and enhancement of functional extensibility of the apparatuses (circuits) on the receiving side.

The present technology has been devised in light of such circumstances, and it is an object of the present technology to allow enhancement of functional extensibility of the apparatuses (circuits) on the receiving side.

Solution to Problem

A data processing apparatus of an aspect of the present technology is a data processing apparatus, a data processing apparatus at a preceding stage, including: a reception section adapted to receive a digital broadcast signal; a processing section adapted to process, of data acquired by a demodulation process of the digital broadcast signal, notification data to be notified to a data processing apparatus at a succeeding stage that performs a process succeeding to the demodulation process and transform the notification data into a transportable format together with reception data acquired from the digital broadcast signal; and an output section adapted to output the notification data to the data processing apparatus at the succeeding stage together with the reception data.

The data processing apparatus of an aspect of the present technology may be an independent apparatus or an internal block included in a single apparatus. Also, a data processing method of an aspect of the present technology is a data processing method corresponding to the data processing apparatus of the aspect of the present technology described above.

In the data processing apparatus and the data processing method of an aspect of the present technology, a digital broadcast signal is received, and, of data acquired by a demodulation process of the digital broadcast signal, notification data to be notified to a data processing apparatus at a succeeding stage that performs a process succeeding to the demodulation process is processed and transformed into a transportable format together with reception data acquired from the digital broadcast signal, and the notification data is output to the data processing apparatus at the succeeding stage together with the reception data.

Advantageous Effects of Invention

According to an aspect of the present technology, it is possible to enhance functional extensibility of apparatuses on a receiving side.

It should be noted that the effects described herein are not necessarily limited and may be any of the effects described in this disclosure.

BRIEF DESCRIPTION OF DRAWINGS

FIG. 4 is a diagram illustrating an example of private user data.

FIG. 6 is a diagram illustrating a structure of a bootstrap.

FIG. 7 is a diagram illustrating a structure of a bootstrap.

FIG. 8 is a diagram illustrating a structure of a bootstrap.

FIG. 9 is a diagram illustrating an example of syntax of L1 basic information (L1-Basic).

FIG. 10 is a diagram illustrating an example of syntax of L1 detailed information (L1-Detail).

FIG. 11 is a diagram illustrating an example of syntax of L1 detailed information (L1-Detail).

FIG. 12 is a diagram illustrating an example of syntax of L1 detailed information (L1-Detail).

FIG. 15 is a diagram illustrating the Generic packet additional header transport scheme.

FIG. 17 is a diagram describing an L2 signaling transport scheme.

FIG. 22 is a diagram describing the BB packet additional header transport scheme.

FIG. 24 is a diagram describing the Generic packet external structure scheme 1.

FIG. 25 is a diagram describing the Generic packet external structure scheme 1.

FIG. 27 is a diagram describing the Generic packet external structure scheme 2.

FIG. 28 is a diagram describing the Generic packet external structure scheme 2.

FIG. 29 is a diagram describing the Generic packet external structure scheme 2.

FIG. 30 is a diagram describing a BB packet external structure scheme.

FIG. 31 is a diagram describing the BB packet external structure scheme.

FIG. 38 is a diagram illustrating a configuration example of a computer.

DESCRIPTION OF EMBODIMENT

A description will be given below of an embodiment of the present technology with reference to figures. It should be noted that the description will be given in the following order:
1. System Configuration
2. Overview of Private User Data
3. Transport Schemes of Private User Data
(A) Generic packet additional header transport scheme
(B) L2 signaling header transport scheme
(C) L2 signaling transport scheme
(D) BB packet additional header transport scheme
(E) Generic packet external structure scheme 1
(F) Generic packet external structure scheme 2
(G) BB packet external structure scheme
(H) IP packet transport scheme
4. Flow of Processes Performed by Reception System
5. Modification Example
6. Configuration of Computer <1. System Configuration>

(Configuration Example of the Transport System)

Figure 1:
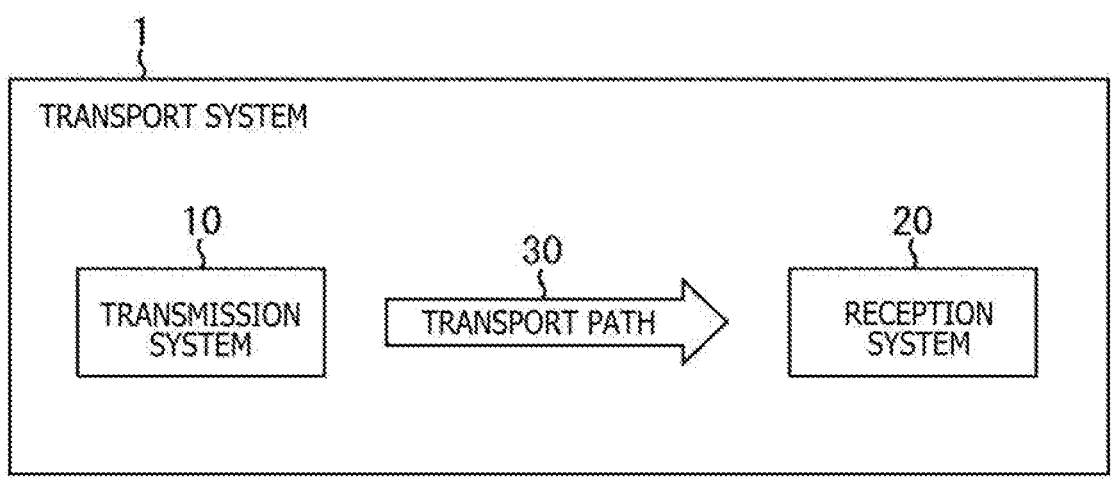
FIG. 1 is a diagram illustrating a configuration of an embodiment of a transport system to which the present technology is applied.

FIG. 1 is a diagram illustrating a configuration of an embodiment of a transport system to which the present technology is applied. It should be noted that a system refers to a logical set of a plurality of apparatuses.

In FIG. 1, a transport system 1 includes a transmission system 10 and a reception system 20. In this transport system 1, data transport compliant with a digital broadcasting standard that adopts an IP transport scheme such as ATSC (Advanced Television Systems Committee) 3.0 takes place.

The transmission system 10 sends a broadcast stream including content such as programs and advertisements as a digital broadcast signal via a transport path 30.

The reception system 20 receives a digital broadcast signal sent from the transmission system 10 via the transport path 30, processes content included in a broadcast stream, and outputs the content.

For example, the reception system 20 includes a plurality of apparatuses such as a data processing apparatus at a preceding stage and a data processing apparatus at a succeeding stage. The data processing apparatus at the preceding stage performs a demodulation process of a digital broadcast signal sent from the transmission system 10 and outputs (sends) data acquired therefrom to the data processing apparatus at the succeeding stage. On the other hand, the data processing apparatus at the succeeding stage performs, on the data output (sent) from the data processing apparatus at the preceding stage, a process succeeding to the demodulation process.

Here, in the reception system 20, the data processing apparatus at the preceding stage corresponds to a demodulation apparatus 211 (FIG. 3) and a home gateway 261 (FIG. 34) which will be described later, and so on. On the other hand, in the reception system 20, the data processing apparatus at the succeeding stage corresponds to a processing apparatus 212 (FIG. 3), a client apparatus 262 (FIG. 34), and so on.

It should be noted that although only one reception system 20 is depicted in the transport system 1 illustrated in FIG. 1 to facilitate description, the plurality of reception systems 20 can be provided, and a digital broadcast signal sent (broadcast) by the transmission system 10 can be received simultaneously by the plurality of reception systems 20 via the transport path 30.

The plurality of transmission systems 10 can also be provided. Each of the plurality of transmission systems 10 can send a digital broadcast signal including a broadcast stream, for example, in a separate frequency band as a separate channel, and the reception system 20 allows selection of a channel from which to receive the broadcast stream from among the respective channels of the plurality of transmission systems 10.

Further, in the transport system 1 illustrated in FIG. 1, the transport path 30 may be not only terrestrial wave (terrestrial wave broadcasting) but also satellite broadcasting using a broadcasting satellite (BS) or communications satellite (CS) or wired broadcasting using cables (CATV).

(Configuration Example of the Transmission System)

Figure 2:
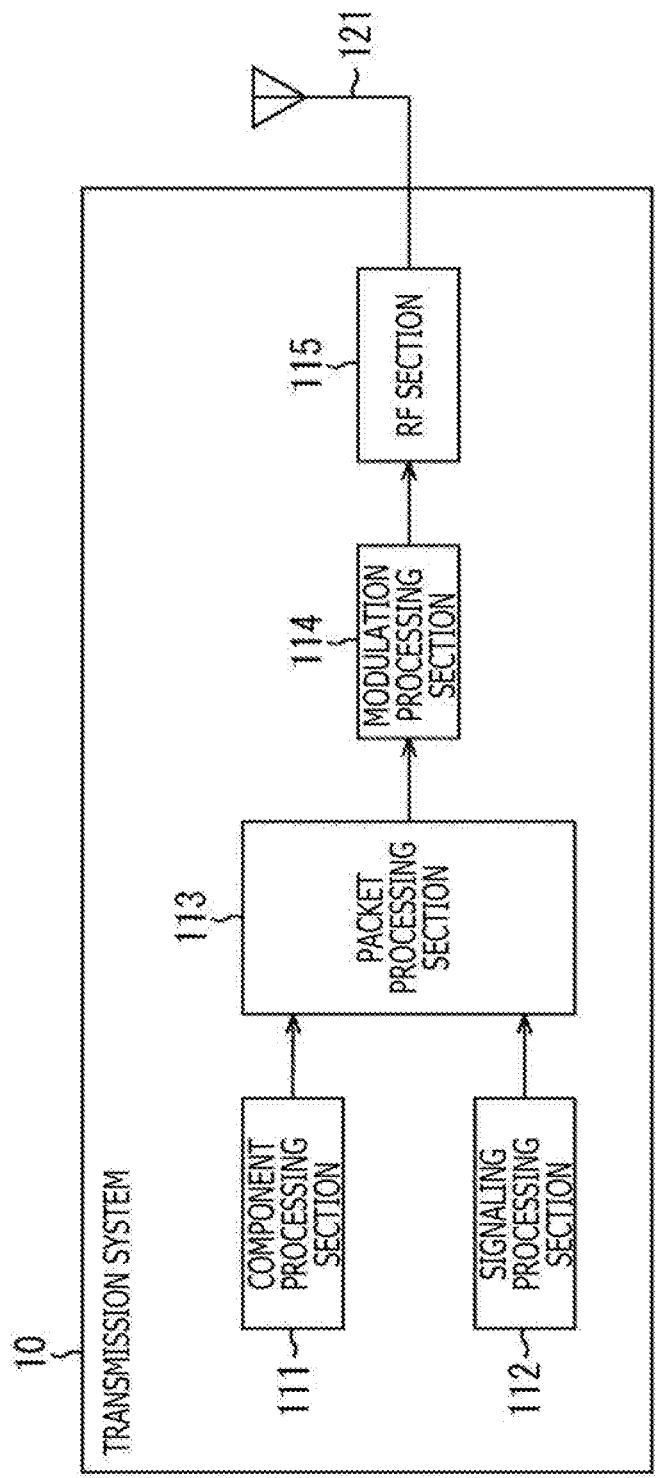
FIG. 2 is a diagram illustrating a configuration example of a transmission system.

FIG. 2 is a diagram illustrating a configuration example of the transmission system 10 illustrated in FIG. 1.

In FIG. 2, the transmission system 10 includes a component processing section 111, a signaling processing section 112, a packet processing section 113, a modulation processing section 114, and an RF section 115.

The component processing section 111 acquires content input thereto. Here, content includes, for example, live content sent from an on-the-spot broadcasting site via a transport path or a communication line (e.g., live programs such as live sport broadcast) and recorded content accumulated in a storage (e.g., prerecorded programs such as dramas).

The component processing section 111 processes (e.g., encodes) video and audio component data included in content and supplies data acquired thereby to the packet processing section 113.

The signaling processing section 112 generates and processes signaling and supplies it to the packet processing section 113. In ATSC 3.0, for example, it is assumed that not only physical layer signaling (hereinafter also referred to as L1 signaling) but also LLS (Link Layer Signaling) signaling, SLS (Service Layer Signaling) signaling, and other upper layer signaling are prescribed as signaling. LLS signaling is signaling acquired ahead of SLS signaling, and SLS signaling for each service is acquired in accordance with information written in LLS signaling.

Here, L1 basic information (L1-Basic) and L1 detailed information (L1-Detail) are prescribed as L1 signaling.

Also, for example, metadata such as SLT (Service List Table) is included as LLS signaling. SLT metadata includes information indicating a stream or service configuration in a broadcast network such as information required for tuning to a service (tuning information).

Further, metadata such as USD (User Service Description), LSID (LCT Session Instance Description), and MPD (Media Presentation Description) is included as SLS signaling. USD metadata includes information such as source of acquisition of other metadata. LSID metadata is control information of ROUTE (Real-Time Object Delivery over Unidirectional Transport) protocol. MPD metadata is control information for managing reproduction of component streams. It should be noted that MPD metadata complies with the MPEG-DASH (Dynamic Adaptive Streaming over HTTP) standard.

The packet processing section 113 performs a process of generating a packet using video and audio component data supplied from the component processing section 111 and signaling data supplied from the signaling processing section 112.

Here, for example, an IP packet including a UDP packet (IP/UDP packet) is generated, and further, a Generic packet is generated by encapsulating one or a plurality of IP/UDP packets. The packet processed by the packet processing section 113 is supplied to the modulation processing section 114.

The modulation processing section 114 generates and processes a physical layer frame by processing the packet supplied from the packet processing section 113. Here, a physical layer frame includes a bootstrap, a preamble, and a payload. It should be noted, however, that L1 signaling generated by the signaling processing section 112 can be included in the preamble.

It should be noted that the modulation processing section 114 also performs, for example, an error correction coding process (e.g., BCH coding and LDPC (Low Density Parity Check) coding), a modulation process (e.g., OFDM (Orthogonal Frequency Division Multiplexing) modulation), and other processes. The signal processed by the modulation processing section 114 is supplied to the RF section 115.

The RF section 115 converts the signal supplied from the modulation processing section 114 into an RF (Radio Frequency) signal and sends it as an IP transport scheme digital broadcast signal via an antenna 121.

The transmission system 10 is thus configured. It should be noted that although FIG. 2 depicts, for reasons of description, as if the transmission system 10 on a transmitting side included a single apparatus, the transmission system 10 on the transmitting side can include a plurality of apparatuses having the respective functions of the blocks illustrated in FIG. 2.

(Configuration Example of the Reception System)

Figure 3:
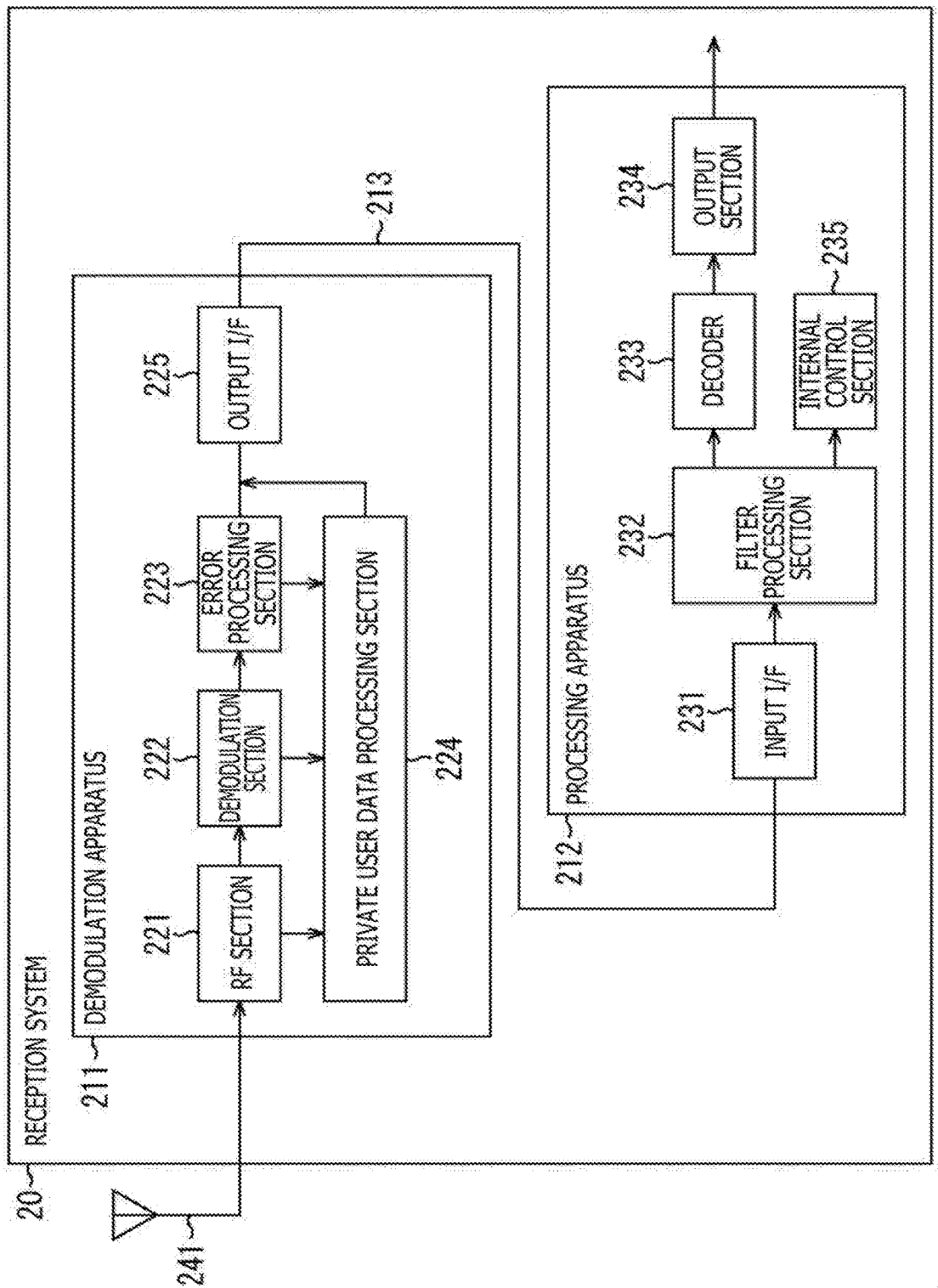
FIG. 3 is a diagram illustrating a configuration example of a reception system.

FIG. 3 is a diagram illustrating a configuration example of the reception system 20 illustrated in FIG. 1.

In FIG. 3, the reception system 20 includes the demodulation apparatus 211 at the preceding stage and the processing apparatus 212 at the succeeding stage. Also, data transport via a single interface (I/F) 213 takes place between the demodulation apparatus 211 and the processing apparatus 212.

The demodulation apparatus 211 includes, for example, an RF IC, a demodulation device such as demodulation LSI, and so on and performs processes regarding a physical layer (PHY). The demodulation apparatus 211 includes an RF section 221, a demodulation section 222, an error processing section 223, a private user data processing section 224, and an output I/F 225.

The RF section 221 receives an IP transport scheme digital broadcast signal via an antenna 241, converts an RF signal in frequency into an IF (Intermediate Frequency) signal, and supplies the IF signal to the demodulation section 222.

The demodulation section 222 performs a demodulation process (e.g., OFDM demodulation) of the signal supplied from the RF section 221. Also, the error processing section 223 performs an error correction decoding process (e.g., LDPC decoding, BCH decoding, or other decoding) of the signal that has undergone the demodulation process. It should be noted, however, that although a description is given here, for reasons of description, by considering that the demodulation process performed by the demodulation section 222 and the error correction decoding process performed by the error processing section 223 are separate processes, the error correction decoding process can be construed as part of the demodulation process. Further, the frequency conversion process and other processes performed by the RF section 221 may be construed as part of the demodulation process.

The demodulation process is performed by the demodulation section 222 and the error processing section 223, thereby allowing the physical layer frame acquired from the signal supplied from the RF section 221 to be processed. Here, the physical layer frame includes a bootstrap, a preamble, and a payload. Also, L1 signaling is included in the preamble.

The data processed by the RF section 221 through the error processing section 223 (reception data) is supplied to the output I/F 225. Here, the output I/F 225 of the demodulation apparatus 211 at the preceding stage and an input I/F 231 of the processing apparatus 212 at the succeeding stage are connected via an interface (I/F) 213, and data from the output I/F 225 (reception data) is input to the input I/F 231.

Also, the RF section 221, the demodulation section 222, and the error processing section 223 supply, to the private user data processing section 224, notification data to be notified to the processing apparatus 212 at the succeeding stage that is acquired as a result of performance of processes by the respective sections. Here, although a detailed description will be given later with reference to FIG. 4 and so on, notification data includes, for example, tuning information used during tuning, information regarding state of the demodulation process, information regarding error of the demodulation process, or information regarding signaling acquired by the demodulation process or modulation parameters, and other information.

The private user data processing section 224 processes notification data supplied from the RF section 221, the demodulation section 222, or the error processing section 223 and causes the notification data to be inserted into data processed by the RF section 221 through the error processing section 223 (reception data) as private user data.

That is, the private user data processing section 224 processes notification data to be notified to the processing apparatus 212 at the succeeding stage and transforms the notification data into a transportable format together with reception data acquired from the demodulation process. As a result, private user data (notification data) is output from the output I/F 225 and input to the input I/F 231 of the processing apparatus 212 via the interface (I/F) 213. It should be noted that a detailed description will be given later of the transport scheme for transporting notification data as private user data with reference to FIGS. 13 to 35.

The demodulation apparatus 211 is thus configured.

The processing apparatus 212 includes, for example, a system-on-chip (SoC) and so on and performs a process for reproducing content by processing a packet as a process succeeding to the demodulation process. The processing apparatus 212 includes the input I/F 231, a filtering process section 232, a decoder 233, an output section 234, and an internal control section 235.

The input I/F 231 supplies, to the filtering process section 232, data input from the demodulation apparatus 211 via the interface (I/F) 213. It should be noted that this data includes reception data acquired by the demodulation process and private user data (notification data).

The filtering process section 232 performs a filtering process of data (a packet holding data) supplied from the input I/F 231. As a result of this filtering process, reception data (a packet holding reception data) is supplied to the decoder 233, and private user data (notification data) (a packet holding private user data) is supplied to the internal control section 235.

It should be noted that although video and audio component data acquired from reception data (a packet holding reception data) is input to the decoder 233, this component data is extracted on the basis of signaling (e.g., LLS signaling and SLS signaling) acquired from reception data (a packet holding reception data).

The decoder 233 decodes video and audio component data supplied from the filtering process section 232 and supplies data acquired therefrom to the output section 234. The output section 234 outputs, of the data supplied from the decoder 233, video data to a display section (not illustrated) and audio data to a speaker (not illustrated). As a result, the reception system 20 reproduces the content image and voice delivered from the transmission system 10.

Also, a packet holding private user data (notification data) from the filtering process section 232 is supplied to the internal control section 235. The internal control section 235 performs a process appropriate to the notification data notified (transported) as private user data.

Here, for example, tuning information used during tuning, information regarding state of the demodulation process, information regarding error of the demodulation process, or information regarding signaling acquired by the demodulation process or modulation parameters, and so on are included as notification data. The internal control section 235 controls the operation of each section of the processing apparatus 212 on the basis of such notification data.

The processing apparatus 212 is thus configured.

<2. Overview of Private User Data>

As described above, in the present technology, in the reception system 20 on the receiving side, notification data to be notified from the demodulation apparatus 211 at the preceding stage to the processing apparatus 212 at the succeeding stage is transported as private user data in the present technology. A description will be given next of an overview of this private user data.

Here, as for the method by which notification data is transported as private user data, for example, a private user data area is reserved in advance in a table prescribed in ATSC 3.0 or other digital broadcasting standard so that, in the reception system 20, the demodulation apparatus 211 can notify the private user data to the processing apparatus 212 by using the reserved area. That is, the transmission system 10 on the transmitting side does not use this reserved area. Therefore, the reception system 20 on the receiving side can add notification data to this reserved area (private user data area).

(Example of Private User Data)

FIG. 4 is a diagram illustrating an example of private user data.

Various pieces of notification data (DATA) identified by data ID (DATA_ID) can be transported as private user data. For example, in FIG. 4, 'tuning frequency' is assigned to data ID "0x00," and in the case where data ID "0x00" is specified by the demodulation apparatus 211, tuning frequency data is notified to the processing apparatus 212 from the demodulation apparatus 211.

In FIG. 4, similarly, various pieces of data are assigned to data ID "0x01" and those that follow. That is, 'PLP_ID,' an ID for identifying PLP (Physical Layer Pipe) is assigned to data ID "0x01." 'AGC_OK' indicating that an AGC (Automatic Gain Control) circuit of the demodulation section 222 has operated properly and captured a reception signal is assigned to data ID "0x02." It should be noted, however, that, here, a reception signal is captured when the variation in reception signal falls within a given range.

'Bootstrap_OK' indicating that a bootstrap has been captured in the demodulation process is assigned to data ID "0x03." 'Preamble_OK' indicating that a preamble has been captured in the demodulation process is assigned to data ID "0x04." It should be noted, however, that it is assumed that a bootstrap or a preamble has been captured when a bootstrap or preamble portion of a signal is received, followed by confirmation of a meaningful value. It should be noted that details of a bootstrap and a preamble will be described later with reference to FIGS. 5 to 12.

'Demod_OK' indicating that the demodulation process has been performed properly is assigned to data ID "0x05." 'Time_Info,' time information such as PTP (Precision Time Protocol) and UTC (Coordinated Universal Time), is assigned to data ID "0x06." 'TRL_OK' indicating that a TRL (Time Recovery Loop) circuit of the demodulation section 222 has operated properly and captured a reception signal is assigned to data ID "0x07." 'CRL_OK' indicating that a CRL (Carrier Recovery Loop) circuit of the demodulation section 222 has operated properly and captured a reception signal is assigned to data ID "0x08."

'PHY_OK' indicating that processes in the physical layer (PHY) have been performed properly is assigned to data ID "0x09." 'L1_Basic_OK' indicating that L1 basic information (L1-Basic) has been captured in the demodulation process is assigned to data ID "0x0a." 'L1_Detail_OK' indicating that L1 detailed information (L1-Detail) has been captured in the demodulation process is assigned to data ID "0x0b." It should be noted, however, that it is assumed that L1 basic information or L1 detailed information has been captured when an L1 basic information or L1 detailed information portion of a signal is received, followed by confirmation of a meaningful value (when reception and demodulation are performed with no LDPC, BCH, and CRC (Cyclic Redundancy Check) error). It should be noted that details of L1 basic information and L1 detailed information will be described later with reference to FIGS. 9 to 12.

'AGC_OK_Time' indicating the time it takes from the proper operation of the AGC circuit of the demodulation section 222 to the capture of a reception signal is assigned to data ID "0x0c." 'Bootstrap_OK_Time' indicating the time it takes to the capture of a bootstrap in the demodulation process is assigned to data ID "0x0d." 'L1_Basic_OK_Time' indicating the time it takes to the capture of L1 basic information (L1-Basic) in the demodulation process is assigned to data ID "0x0d." 'L1_Detail_OK_Time' indicating the time it takes to the capture of L1 detailed information (L1-Detail) in the demodulation process is assigned to data ID "0x0e."

'AGC_Level' indicating an AGC level is assigned to data ID "0x0f." 'Bootstrap_Max_Correlation,' information regarding correlation between bootstraps, is assigned to data ID "0x10." 'Bootstrap_Pack_Ratio,' information regarding bootstrap pack ratio, is assigned to data ID "0x11."

'Sampling_Frequency_Offset,' information (in ppm) indicating a sampling frequency offset, is assigned to data ID "0x12." 'Carrier_Frequency_Offset,' information (in kHz) indicating a carrier frequency offset, is assigned to data ID "0x13."

'LDPC_Number_iteration,' information regarding LDPC decoding, is assigned to data ID "0x14." 'BCH_Error' indicating error during BCH decoding is assigned to data ID "0x15." 'CRC_Error' indicating error in error detection by cyclic redundancy check (CRC) is assigned to data ID "0x16."

'MER' indicating a modulation error ratio (MER) is assigned to data ID "0x17." 'SNR' indicating an SN ratio (SNR: Signal Noise Ratio) is assigned to data IDs "0x18" to "0x1b." It should be noted, however, that data ID "0x18" indicates the SNR at a certain moment, that data ID "0x19" indicates the average SNR, and that data IDs "0x1a" and "0x1b" indicate the maximum and minimum SNRs.

'Error Indicator' indicating an error indicator is assigned to data ID "0x1c." 'Bit_Error_Rate' indicating a bit error rate (BER) is assigned to data ID "0x1e."'Emergency Information,' information regarding emergency information, is assigned to data ID "0x1f."

'Frame_Error_Rate' indicating a frame error rate (FER) is assigned to data ID "0x20." 'Packet_Error_Rate' indicating a packet error rate (PER) is assigned to data ID "0x21." 'Manufacturer ID' for identifying a manufacturer recorded in advance in the demodulation apparatus 211 (demodulation device) is assigned to data ID "0x22." 'Manufacturer version,' a version for each manufacturer recorded in advance in the demodulation apparatus 211 (demodulation device), is assigned to data ID "0x23." It should be noted that data IDs "0x24" to "0x3f" are areas for future extension.

'Bootstrap,' bootstrap data acquired by the demodulation process, is assigned to data ID "0x40." 'L1_Basic_signaling,' L1 basic information (L1-Basic) data acquired by the demodulation process, is assigned to data ID "0x60." 'L1_Detail_signaling,' L1 detailed information (L1-Detail) data acquired by the demodulation process, is assigned to data ID "0x90." It should be noted that details of bootstrap, L1 basic information and L1 detailed information will be described later with reference to FIGS. 5 to 12.

Data IDs "0xd0" to "0xdf" are areas that can be extended by a manufacturer manufacturing the reception system 20 (demodulation apparatus 211 or processing apparatus 212 thereof) on its own. Also, data IDs "0xf0" to "0xff" are areas for future extension. It should be noted that although notification data and identification information thereof that can be transported as private user data are illustratively listed in FIG. 4, notification data other than that illustrated in FIG. 4 may be transported as private user data.

Of notification data illustrated as private user data in FIG. 4, a description will be given here of details of bootstrap, L1 basic information (L1-Basic), and L1 detailed information (L1-Detail).

(Structure of the Physical Layer Frame)

Figure 5:
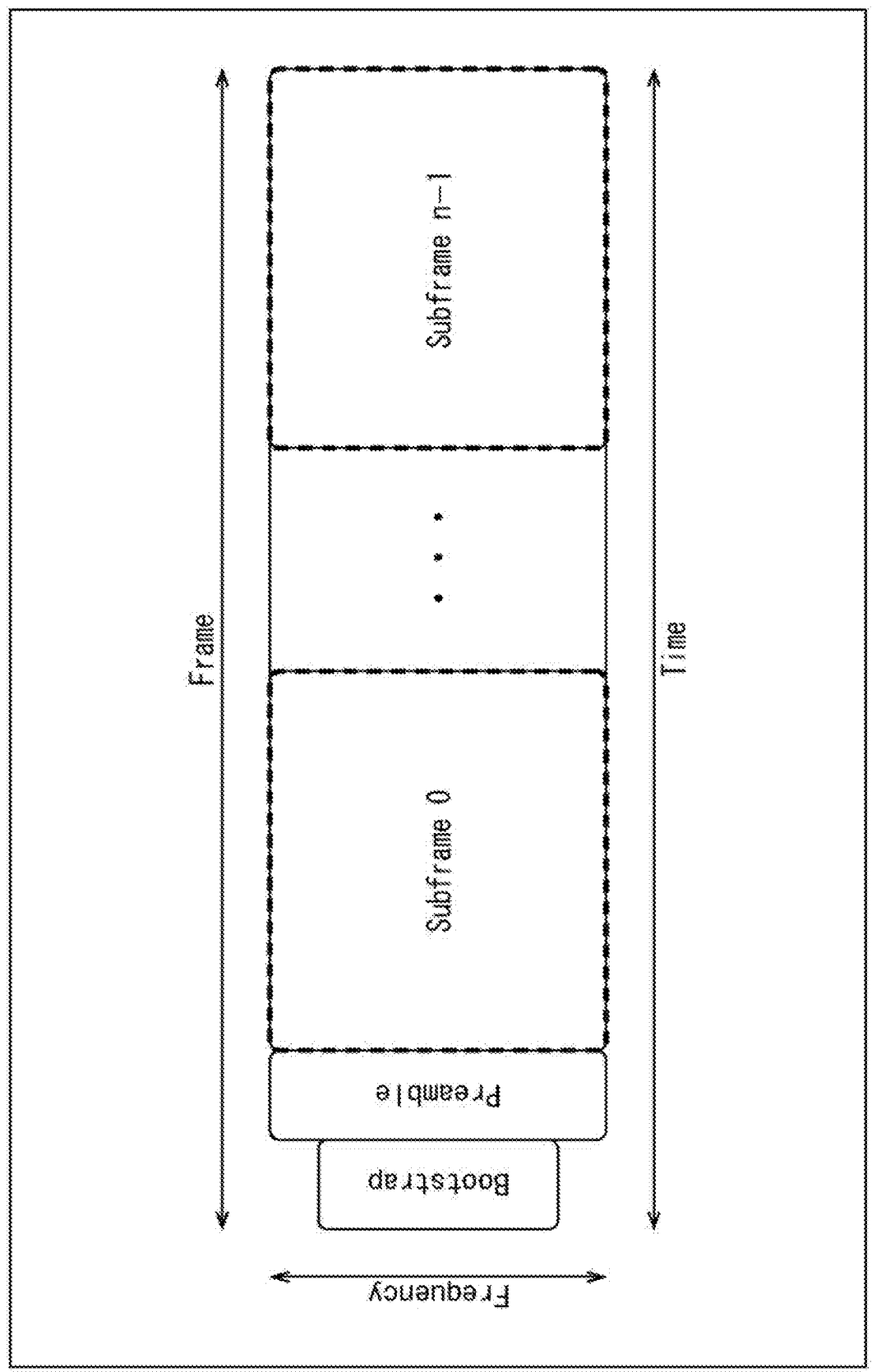
FIG. 5 is a diagram illustrating a structure of a physical layer frame.

FIG. 5 is a diagram illustrating a structure of a physical layer frame. In FIG. 5, the horizontal direction represents time, and the vertical direction represents frequency.

A physical layer frame includes a bootstrap, a preamble, and one or more subframes. A physical layer frame has a given frame length such as in milliseconds. In a physical layer frame, a subframe succeeding to a bootstrap and a preamble can be acquired after acquisition of the bootstrap and the preamble.

A bootstrap corresponds, for example, to a P1 symbol included in a T2 frame of DVB-T2, and a preamble corresponds, for example, to a P2 symbol included in a T2 frame of DVB-T2. Therefore, it can be said that a bootstrap is a preamble.

L1 signaling such as L1 basic information (L1-Basic) and L1 detailed information (L1-Detail) can be included in a preamble. Here, comparison between L1 basic information and L1 detailed information indicates that L1 basic information and L1 detailed information are sized differently in that while L1 basic information includes approximately 200 bits, L1 detailed information includes 400 to several thousand bits. Also, L1 basic information and L1 detailed information are read in this order from a preamble. Therefore, L1 basic information is read earlier than L1 detailed information. Further, L1 basic information is different from L1 detailed information in that L1 basic information is transported more robustly.

A payload (data) is provided in a subframe. In the case where two or more subframes are included in a physical layer frame, it is possible to change modulation parameters such as FFT size, guard interval length, and pilot pattern for each subframe.

(Bootstrap Structure)

FIGS. 6 to 8 are diagrams illustrating the structure of the bootstrap illustrated in FIG. 5.

FIGS. 6 to 8 illustrate bootstrap symbols respectively in the cases where bootstrap symbols 1 to 3 are transported by the bootstrap (signal thereof) illustrated in FIG. 5. It should be noted, however, that each bootstrap symbol can transport a signal of up to 11 bits.

As illustrated in the syntax of FIG. 6, bootstrap symbol 1 includes 1-bit eas wake up, 2-bit system bandwidth, and 5-bit min time to next. Also, as illustrated in the syntax of FIG. 7, bootstrap symbol 2 includes 7-bit bsr coefficient. Further, as illustrated in the syntax of FIG. 8, bootstrap symbol 3 includes 7-bit preamble structure.

(Structure of L1 Basic Information)

FIG. 9 is a diagram illustrating an example of syntax of L1 basic information (L1-Basic) included in the preamble illustrated in FIG. 5.

The 2-bit L1B content tag indicates the tag value that identifies content. The 3-bit L1B version indicates the version of L1 basic information. The 1-bit L1B_slt_flag indicates whether an SLT (Service Labeling Table) exists.

The 1-bit L1B_time_info flag indicates whether time information exists. The 2-bit L1B_papr indicates application of PAPR (Peak to Average Power Reduction).

The 1-bit L1B_frame_length_mode indicates the frame mode. In the case where L1B_frame_length_mode=0, the frame mode is time align mode. Also, in the case where L1B_frame_length_mode=1, the frame mode is symbol align mode.

The 10-bit L1B_frame_length indicates the frame length of the physical layer frame. It should be noted, however, that this L1B_frame_length is used only in the case where the frame mode is time align mode and that the L1B_frame_length is not used in the case where the frame mode is symbol align mode.

The 8-bit L1B_num_subframes indicates the number of subframes included in the physical layer frame. The 3-bit L1B_preamble_num_symbols indicates the number of OFDM symbols included in the preamble. The 3-bit L1B_preamble_reduced_carriers indicates the number of control units that is appropriate to the reduction in maximum number of FFT size carriers used in the preamble.

The 16-bit L1B_L1_Detail_size_bits indicates the size of L1 detailed information (L1-Detail). The 3-bit L1B_L1_Detail_fec_type indicates the FEC type of L1 detailed information. The 2-bit L1B_L1_Detail_additional_parity_mode indicates the additional parity mode of L1 detailed information. The 19-bit L1B_L1_Detail_total_cells indicates the total size of L1 detailed information.

The 1-bit L1B_First_Sub_mimo indicates the usage state of MIMO (Multiple Input and Multiple Output) of the first subframe. The 1-bit L1B_First_Sub_miso indicates the usage state of MISO (Multiple Input and Single Output) of the first subframe.

The 2-bit L1B_First_Sub_fft_size indicates the FFT size of the first subframe. The 3-bit L1B_First_Sub_reduced_carriers indicates the number of control units that is appropriate to the reduction in maximum number of FFT size carriers used in the first subframe. The 4-bit L1B_First_Sub_guard_interval indicates the guard interval length of the first subframe.

The 13-bit L1B_First_Sub_excess_samples indicates the number of excess samples inserted into the guard interval portion in the first subframe. It should be noted, however, that this L1B_First_Sub_excess_samples is used only in the case where the frame mode is time align mode and that the L1B_First_Sub_excess_samples is not used in the case where the frame mode is symbol align mode.

The 11-bit L1B_First_Sub_num_ofdm_symbols indicates the number of OFDM symbols included in the first subframe. The 5-bit L1B_First_Sub_scattered_pilot_pattern indicates the SP pattern (Scattered Pilot Pattern) used in the first subframe. The 3-bit L1B_First_Sub_scattered_pilot_boost indicates the value that increases the size of the SP pattern.

The 1-bit L1B_First_Sub_sbs_first indicates the beginning of the SBS (Subframe Boundary Symbol) of the first subframe. The 1-bit L1B_First_Sub_sbs_last indicates the end of the SBS of the first subframe.

The L1B_Reserved is an area for future extension (Reserved). The bit count of the L1B_Reserved is to be determined (TBD). However, it is 49 bits at present. The 32-bit L1B_crc indicates that a CRC value is included.

It should be noted that in the case where uimsbf (unsigned integer most significant bit first) is specified as a format, this means that the value is treated as an integer through bit calculation. Also, in the case where bslbf (bit string, left bit first) is specified, this means that the value is treated as a bit string.

Also, details of L1 basic information (L1-Basic) are given in 'Table 9.2 L1-Basic signaling fields and syntax' in the above NPL 1.

(Structure of L1 Detailed Information)

FIGS. 10 to 12 are diagrams illustrating an example of syntax of L1 detailed information (L1-Detail) included in the preamble illustrated in FIG. 5.

The 4-bit L1D version indicates the version of L1 detailed information.

A parameter regarding channel bonding is provided in a loop corresponding to the 3-bit L1D_num_rf. That is, the 19-bit L1D_rf_frequency indicates the frequency of the RF channels combined by channel bonding.

Here, in the case where L1B_time_info_flag=1 in the L1 basic information illustrated in FIG. 9, this indicates that time information exists. Therefore, L1D_time_info is provided in L1 detailed information as time information. It should be noted that the number of bits of L1D_time_info is to be determined (TBD).

The following parameters regarding subframe are provided in a loop corresponding to L1B_num_subframes of L1 basic information illustrated in FIG. 9:

The 1-bit L1D_mimo indicates the usage state of MIMO of the subframe. The 1-bit L1D_miso indicates the usage state of MISO of the subframe. The 2-bit L1D_fft_size indicates the FFT size of the subframe.

The 3-bit L1D_reduced_carriers indicates the number of control units that is appropriate to the reduction in maximum number of FFT size carriers used in the subframe. The 4-bit L1D_guard_interval indicates the guard interval length of the subframe. The 11-bit L1D_num_ofdm_symbols indicates the number of OFDM symbols included in the subframe.

The 5-bit L1D_scattered_pilot_pattern indicates the SP pattern used in the subframe. The 3-bit L1D_scattered_pilot_boost indicates the value that increases the size of the SP pattern. The 1-bit L1D_sbs_first indicates the beginning of the SBS of the subframe. The 1-bit L1D_sbs_last indicates the end of the SBS of the subframe.

The 1-bit L1D_subframe_multiplex indicates whether the subframe is time-division-multiplexed. The 1-bit L1D_frequency_interleaver indicates whether frequency interleaving is applied.

PLP-related parameters are provided in the 6-bit L1D_num_plp. As these parameters, the 6-bit L1D_plp_id, the 1-bit L1D_plp_slt_exist, the 2-bit L1D_plp_layer, the 24-bit L1D_plp_start, the 24-bit L1D_plp_size, the 2-bit L1D_plp_scrambler_type, the 4-bit L1D_plp_fec_type, and so on are provided.

Although not all PLP-related parameters are described here, details of L1 detailed information (L1-Detail) are given in 'Table 9.12 L1-Detail signaling fields and syntax' in the above NPL 1.

<3. Transport Schemes of Private User Data>
(Overview of Private User Data Transport Schemes)

Figure 13:
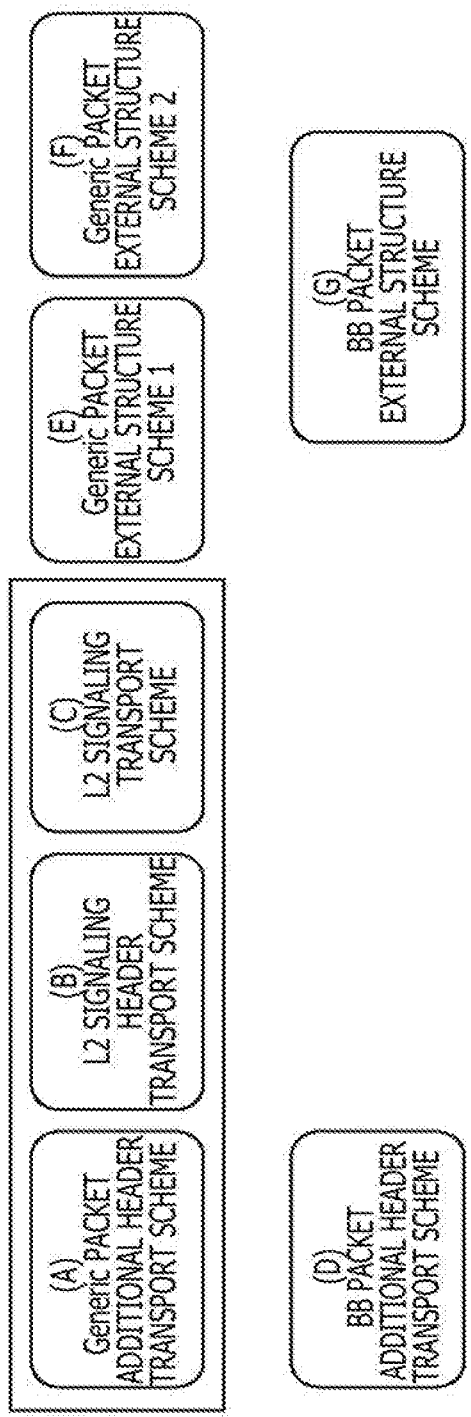
FIG. 13 is a diagram illustrating an overview of a transport scheme for transporting private user data.

FIG. 13 is a diagram illustrating an overview of a transport scheme for transporting notification data as private user data.

Private user data can be transported by using any one of transport schemes (A) to (H) described below.
(A) Generic packet additional header transport scheme
(B) L2 signaling header transport scheme
(C) L2 signaling transport scheme
(D) BB packet additional header transport scheme
(E) Generic packet external structure scheme 1
(F) Generic packet external structure scheme 2
(G) BB packet external structure scheme
(H) IP packet transport scheme Here, layer 1 (L1), a physical layer, layer 2 (L2), an upper layer of layer 1, and layer 3 (L3), an upper layer of layer 2, have a hierarchical structure in the protocol stack of the IP transport schemes as illustrated in FIG. 13.

In layer 3 (L3), an IP packet (IP/UDP packet) or tuning information is transported. It should be noted, however, that LLS signaling can be provided in an IP packet by including tuning information in the LLS signaling.

This IP packet (IP/UDP packet) includes an IP header and a payload. Video and audio component data, signaling data such as SLS signaling, and so on are provided in the payload of the IP packet. Here, in the case where the (H) IP packet transport scheme is used, private user data (notification data) is provided, for example, in the payload of the IP packet.

A Generic packet as a transport packet is transported in layer 2 (L2). This Generic packet includes a Generic header and a payload. One or a plurality of IP packets or a plurality of pieces of tuning information are provided in the payload of the Generic packet and encapsulated.

Here, in the case where the (A) Generic packet additional header transport scheme is used, private user data (notification data) is provided in the additional header of this Generic packet header. Also, in the case where the (B) L2 signaling header transport scheme is used, private user data (notification data) is provided in the L2 signaling header provided in the payload of the Generic packet.

Also, in the case where the (C) L2 signaling transport scheme is used, private user data (notification data) as L2 signaling is provided in the payload of the Generic packet. Further, in the case where the (E) Generic packet external structure scheme 1 or the (F) Generic packet external structure scheme 2 is used, private user data (notification data) is provided by using the external structure of the Generic packet.

In layer 1 (L1), a BB packet (BBP: Baseband Packet) as a transport packet is transported. This BB packet includes a BBP header and a payload. One or a plurality of Generic packets are provided in the payload of the BB packet and encapsulated.

Here, in the case where the (D) BB packet additional header transport scheme is used, private user data (notification data) is provided in the additional header of the BB packet. Also, in the case where the (G) BB packet external structure scheme is used, private user data (notification data) is provided by using the external structure of the BB packet.

It should be noted that data acquired by scrambling one or a plurality of BB packets in layer 1 is mapped onto an FEC frame (FEC Frame), and an error correction parity of the physical layer is added. Here, the physical layer frame includes a bootstrap, a preamble, and a payload. Data acquired by bit-interleaving of the plurality of FEC frames followed by mapping process and further by physical layer processing (modulation process) such as interleaving in the time and frequency directions is mapped into this payload. It should be noted that the frame length of the physical layer frame is, for example, 100 to 200 ms.

Thus, it is possible to transport information (notification data) of the demodulation apparatus 211 (demodulation device) at the preceding stage to the processing apparatus 212 (system-on-chip (SoC)) at the succeeding stage at high speed and in real time by using the transport schemes illustrated in FIG. 13. Also, in each of the transport schemes illustrated in FIG. 13, extension is carried out by using the same format as each packet. This makes it easy to implement processing in the demodulation apparatus 211 at the preceding stage to the processing apparatus 212 at the succeeding stage. Further, although each of the transport schemes illustrated in FIG. 13 is premised on the use of an IP transport scheme, the demodulation apparatus 211 at the preceding stage and the processing apparatus 212 at the succeeding stage are connected via the single interface (I/F) 213 in the reception system 20, and what lies between the apparatuses is realized by a single interface (I/F) as with the configuration corresponding to the conventional transport stream (TS). A description will be given below of details of the eight transport schemes from (A) to (H) illustrated in FIG. 13.

(A) Generic Packet Additional Header Transport Scheme

A description will be given first of the Generic packet additional header transport scheme with reference to FIGS. 14 and 15. In this Generic packet additional header transport scheme, private user data (notification data) is transported by using an additional header of a Generic packet.

Figure 14:
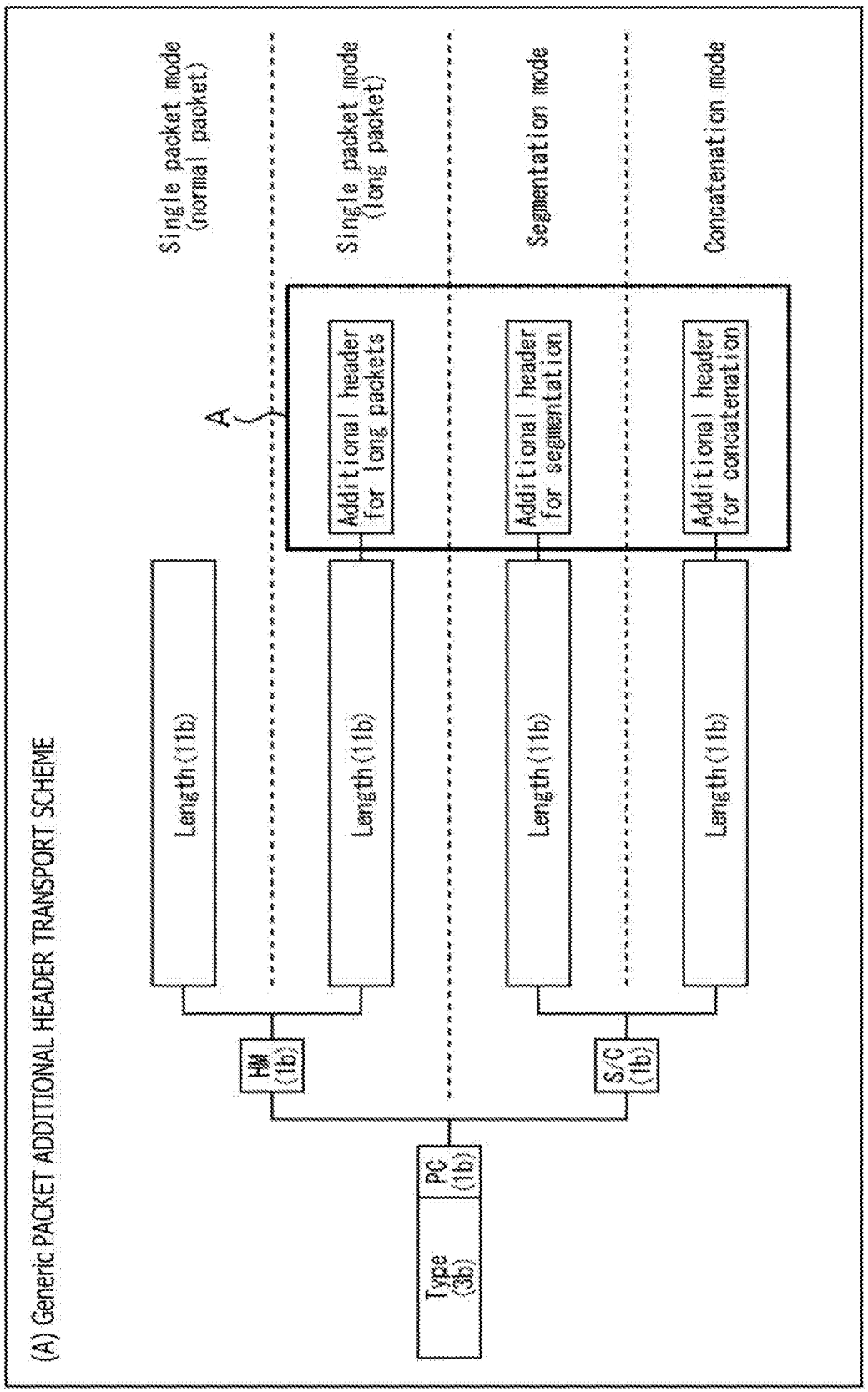
FIG. 14 is a diagram illustrating a Generic packet additional header transport scheme.

FIG. 14 illustrates a configuration of a Generic packet. Three-bit type information (Type) is set at the beginning of a Generic header of the Generic packet illustrated in FIG. 14. Information regarding the type of data provided in the Generic payload is set in this type information.

In the Generic header, type information is followed by 1-bit packet setting information (PC: Packet Configuration). In the case where "0" is set as packet configuration, single packet mode is selected in accordance with 1-bit header mode (HM) that follows, and 11-bit length (Length) information and additional header are provided in the Generic header. Also, the Generic header is followed by a payload in the Generic packet.

It should be noted that, in the single packet mode, while a Generic packet with no additional header is called a normal packet, a Generic packet with an additional header is called a long packet.

On the other hand, in the case where "1" is set as packet setting information (PC), segmentation mode or concatenation mode is selected in accordance with 1-bit S/C (Segmentation/Concatenation) that follows, and 11-bit length (Length) information and additional header are provided in the Generic header.

Here, in the Generic additional header transport scheme, private user data is provided in the additional header enclosed by frame 'A' in the figure. That is, in the case of single packet mode (long packet) and segmentation mode, and in the case where "1" is set as optional header extension flag (OHF) in the additional header, an optional header is provided. Also, in the case of concatenation mode, and in the case where "1" is set as sub-stream identifier flag (SIF) in the additional header, an optional header is provided.

The structure illustrated in FIG. 15 can be provided in this optional header. In the structure of FIG. 15, various pieces of information are provided for each additional header index. For example, in the case where "000000" is set as an additional header index, it is possible to define the provision of private user data in the optional header.

A combination of a data ID (DATA_ID) and notification data (DATA) identified by that data ID is provided as this private user data. For example, in the case where data ID "0x00" is specified as illustrated in FIG. 15, tuning frequency data is provided. Also, for example, in the case where data ID "0x60" is specified, L1 basic information (L1-Basic) data is provided, and in the case where data ID "0x90" is specified, L1 detailed information (L1-Detail) data is provided. It should be noted that the private user data illustrated in FIG. 15 is merely an example, and other private user data may be provided.

Thus, by adopting the Generic packet additional header transport scheme as a transport format for transporting private user data, it is possible to notify private user data (notification data) from the demodulation apparatus 211 at the preceding stage to the processing apparatus 212 at the succeeding stage in the reception system 20 by using an additional header of a Generic packet.

(B) L2 Signaling Header Transport Scheme

A description will be given next of the L2 signaling header transport scheme with reference to FIG. 16. In this L2 signaling header transport scheme, private user data (notification data) is transported by using L2 signaling header provided in a payload of a Generic packet.

Figure 16:
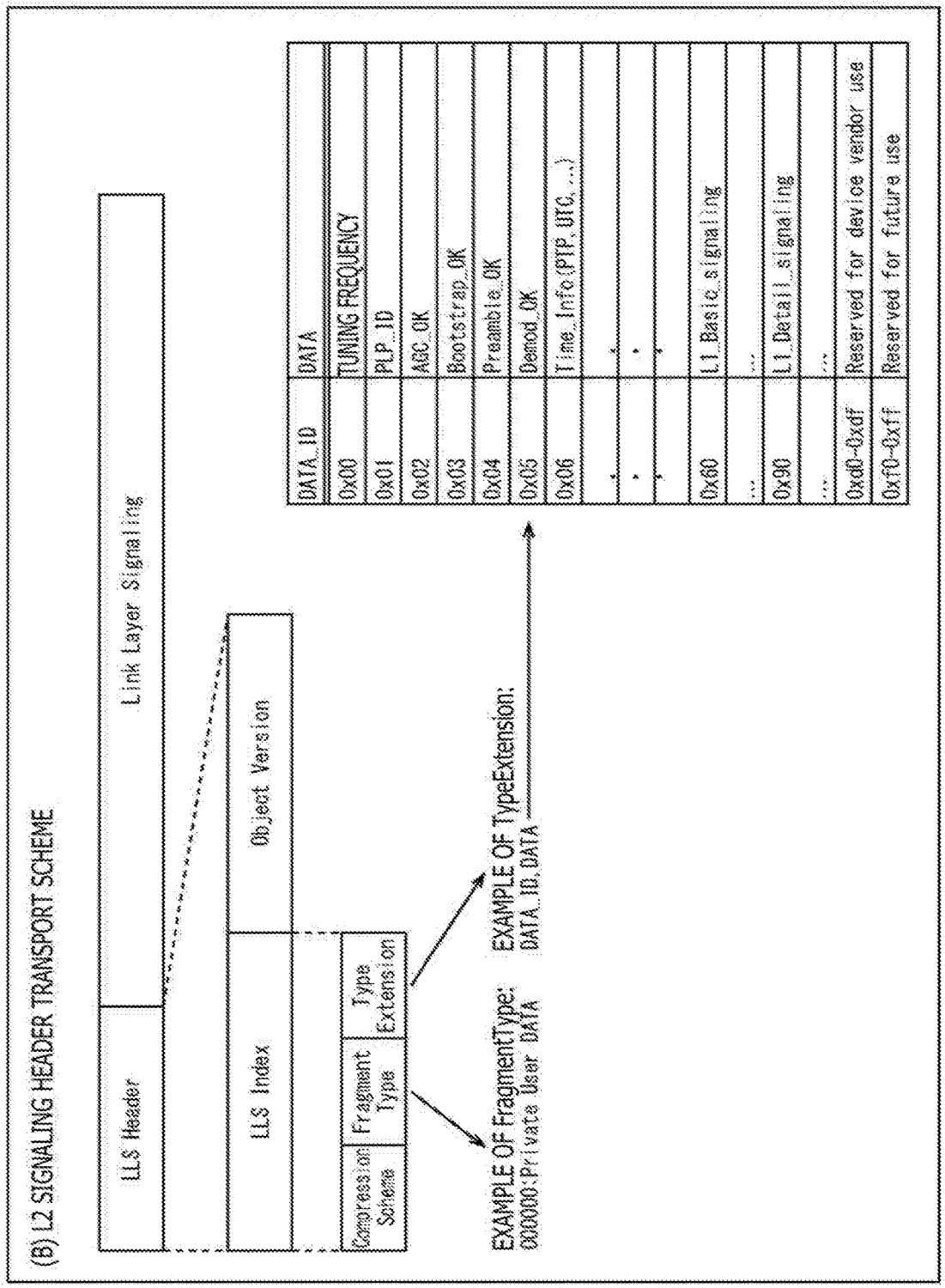
FIG. 16 is a diagram describing an L2 signaling header transport scheme.

FIG. 16 illustrates a configuration of an LLS (Link Layer Signaling) packet as a Generic packet of Layer 2.

In FIG. 16, an IP packet and L2 signaling are provided in the payload of the Generic packet, and this example illustrates a case in which LLS signaling is provided as L2 signaling. Metadata such as SLT is included as this LLS signaling.

Here, in the case where LLS signaling is provided in the payload of the Generic packet, it can be said that the Generic packet is also an LLS packet. This LLS packet includes an LLS header and a payload having LLS signaling (LLS). It should be noted that, in this case, an LLS packet is provided in the payload of a BB packet and encapsulated.

Also, a structure including LLS index information (LLS Index) and object version information (Object Version) can be provided in the LLS header.

Compression information (Compression Scheme), type information (Fragment Type), and extension type information (Type Extension) are provided in LLS index information. Information indicating whether target LLS signaling is compressed is set in compression information. For example, in the case where "0000" is set, this indicates that LLS signaling is not compressed, and in the case where "0001" is set, this indicates that LLS signaling is compressed in zip format.

Information regarding LLS signaling type is set in type information. Here, in the case where "000000" is set as type information, it is possible to define the provision of private user data in extension type information.

An extension parameter is set in extension type information for each type. Here, in the case where "000000" is set as type information, a combination of a data ID (DATA_ID) and notification data (DATA) identified by that data ID is provided in extension type information as private user data.

For example, in the case where data ID "0x00" is specified in extension type information as illustrated in FIG. 16, tuning frequency data is provided. Also, for example, in the case where data ID "0x60" is specified, L1 basic information (L1-Basic) data is provided, and in the case where data ID "0x90" is specified, L1 detailed information (L1-Detail) data is provided. It should be noted that the private user data illustrated in FIG. 16 is merely an example, and other private user data may be provided.

Thus, by adopting the L2 signaling header transport scheme as a transport format for transporting private user data, it is possible to notify private user data (notification data) from the demodulation apparatus 211 at the preceding stage to the processing apparatus 212 at the succeeding stage in the reception system 20 by using an L2 signaling header.

It should be noted that although the case is described in which LLS signaling is provided as L2 signaling in the description of FIG. 16 for reasons of description, it is actually also assumed that LLS signaling is transported by an IP/UDP packet. A similar structure can be used even in the case where L2 signaling other than LLS signaling is used.

(C) L2 Signaling Transport Scheme

A description will be given next of the L2 signaling transport scheme with reference to FIGS. 17 and 18. In this L2 signaling transport scheme, private user data (notification data) is transported by using L2 signaling provided in a payload of a Generic packet.

FIG. 17 is a diagram illustrating syntax of L2 signaling (Private_User_data_signaling( )) corresponding to private user data.

The 8-bit signaling type indicates the type corresponding to the L2 signaling type. For example, in the case of L2 signaling corresponding to private user data, "0xff" is set as signaling type.

The 8-bit NUM_DATA indicates the number of pieces of private user data provided in the L2 signaling. The 8-bit DATA_ID and the 8-bit DATA are provided in a private user data loop corresponding to this NUM_DATA. Here, a data ID is provided in the DATA_ID. Also, notification data is provided in the DATA. It should be noted, however, that notification data (DATA) is provided in accordance with the data length indicated by the 8-bit DATA_LENGTH.

Thus, the loop is repeated in accordance with the number of pieces of private user data, and a combination of a data ID (DATA_ID) and notification data (DATA) identified by that data ID is provided. For example, in the case where data ID "0x00" is specified as illustrated in FIG. 18, tuning frequency data is provided. Also, for example, in the case where data ID "0x60" is specified, L1 basic information (L1-Basic) data is provided, and in the case where data ID "0x90" is specified, L1 detailed information (L1-Detail) data is provided.

Figure 18:
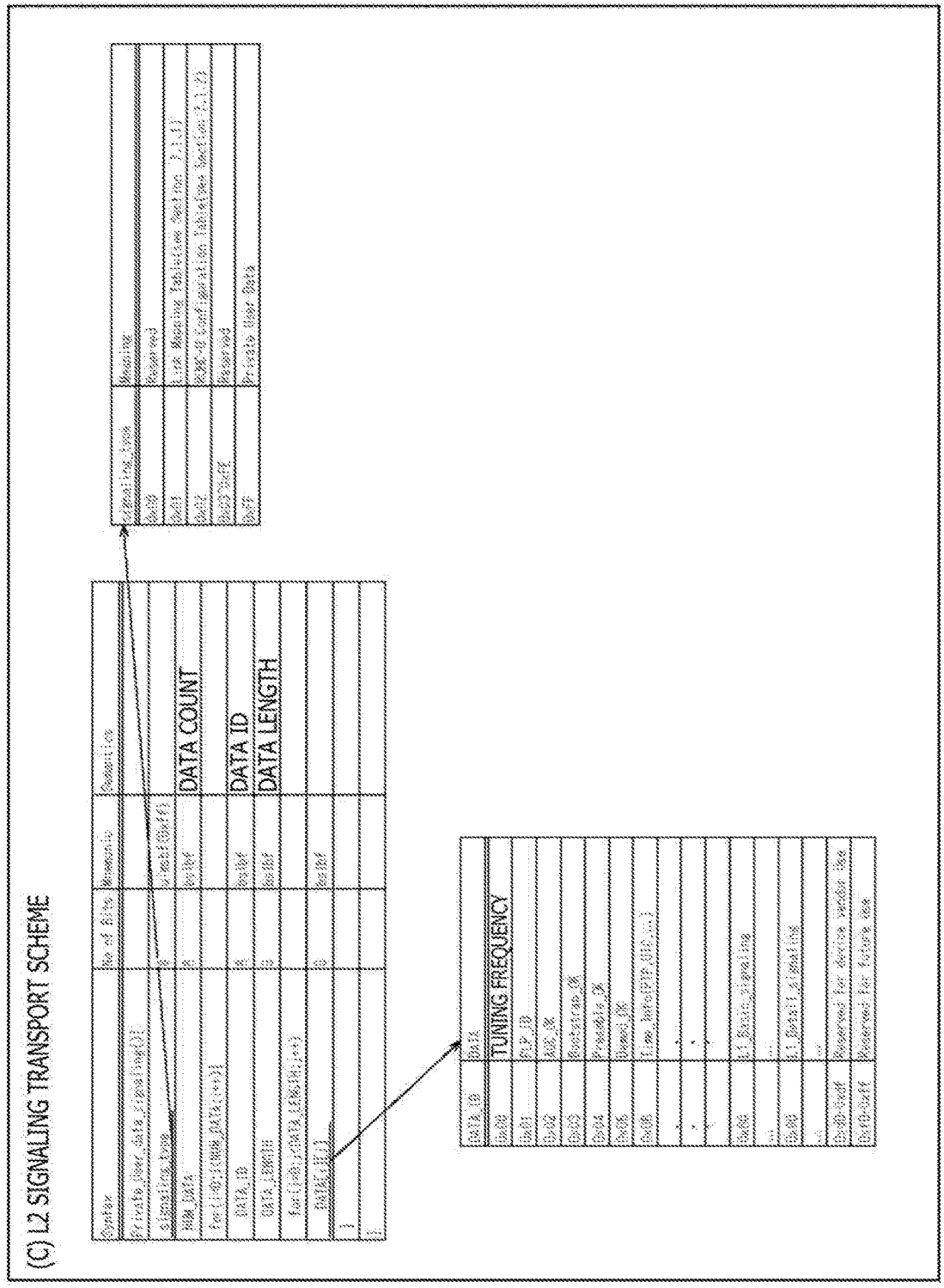
FIG. 18 is a diagram describing the L2 signaling transport scheme.

It should be noted that the private user data illustrated in FIG. 18 is merely an example, and other private user data may be provided. Also, here, the L2 signaling illustrated in FIG. 17 may be provided in the payload of the Generic packet. Alternatively, the content of the L2 signaling illustrated in FIG. 17 may be included in (added to) existing L2 signaling (e.g., LLS signaling) provided in the payload of the Generic packet.

Thus, by adopting the L2 signaling transport scheme as a transport format for transporting private user data, it is possible to notify private user data (notification data) from the demodulation apparatus 211 at the preceding stage to the processing apparatus 212 at the succeeding stage in the reception system 20 by using L2 signaling.

(D) BB Packet Additional Header Transport Scheme

A description will be given next of the BB packet additional header transport scheme with reference to FIGS. 19 to 22. In this BB packet additional header transport scheme, private user data (notification data) is transported by using an additional header of a BB packet.

Figure 19:
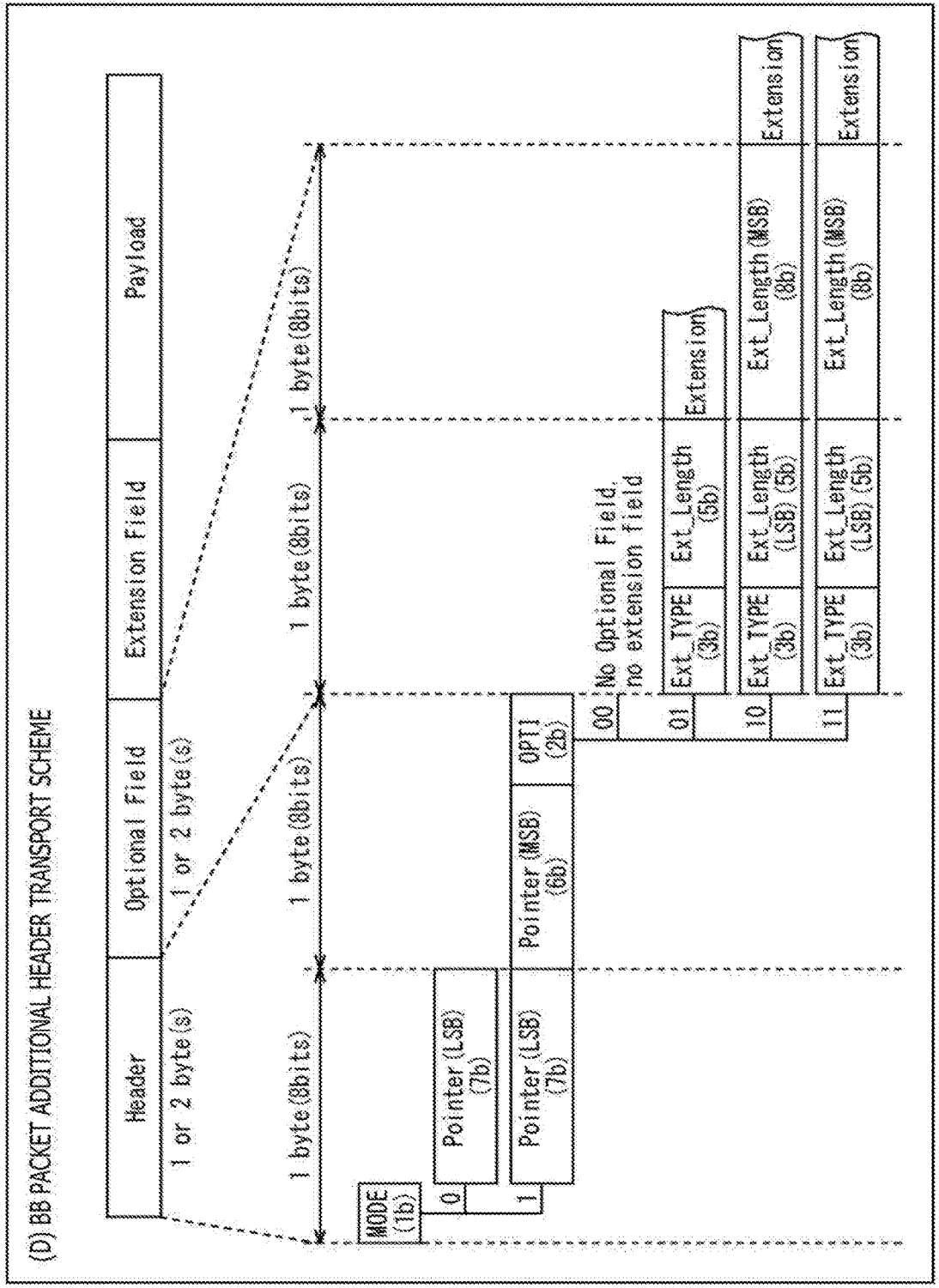
FIG. 19 is a diagram describing a BB packet additional header transport scheme.

FIG. 19 illustrates a configuration of a BB packet (Baseband Packet). In FIG. 19, the BB packet includes a BBP header and a payload. Not only a 1- or 2-byte header but also an optional field and an extension field can be provided in the BBP header.

That is, in the case where "0" is set in the header as a 1-bit mode, 7-bit pointer information (Pointer(LSB)) is provided. It should be noted that pointer information is information for indicating the position of the Generic packet provided in the payload of the BB packet. For example, in the case where the Generic packet data provided last in a certain BB packet is provided in such a manner as to extend to the next BB packet, it is possible to set position information of the Generic packet provided at the beginning of the next BB packet as pointer information.

Also, in the case where "1" is set as mode, not only 7-bit pointer information (Pointer(LSB)) but also 6-bit pointer information (Pointer(MSB)) and a 2-bit optional flag (OPTI: OPTIONAL) are provided. The optional flag is information indicating whether the header is extended by providing an optional field and an extension field.

Figure 20:
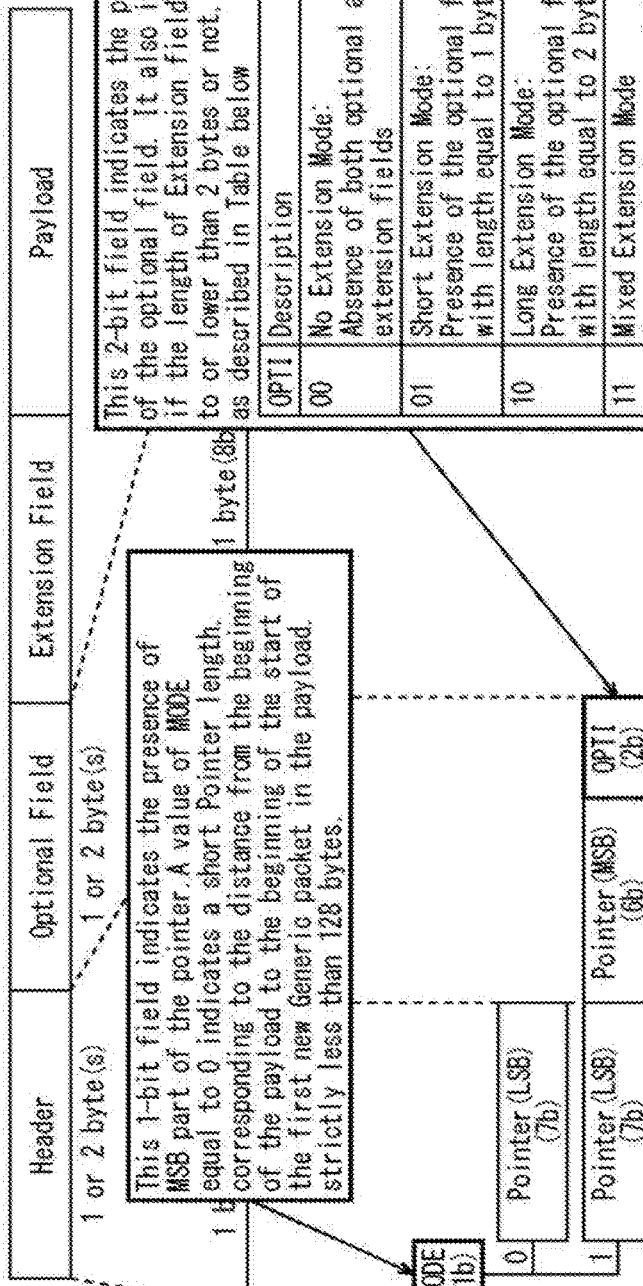
FIG. 20 is a diagram describing the BB packet additional header transport scheme.

That is, as illustrated in FIG. 20, in the case where no optional and extension fields are extended, "00" is set in the optional flag. Also, in the case where a 1-byte optional field and an extension field are extended, "01" is set in the optional flag. As a result, short extension mode is selected (frame 'A' in the figure). On the other hand, in the case where a 2-byte optional field and an extension field are extended, "10" or "11" is set in the optional flag, causing long extension mode or mixed extension mode to be selected (frame 'B' in the figure).

Figure 21:
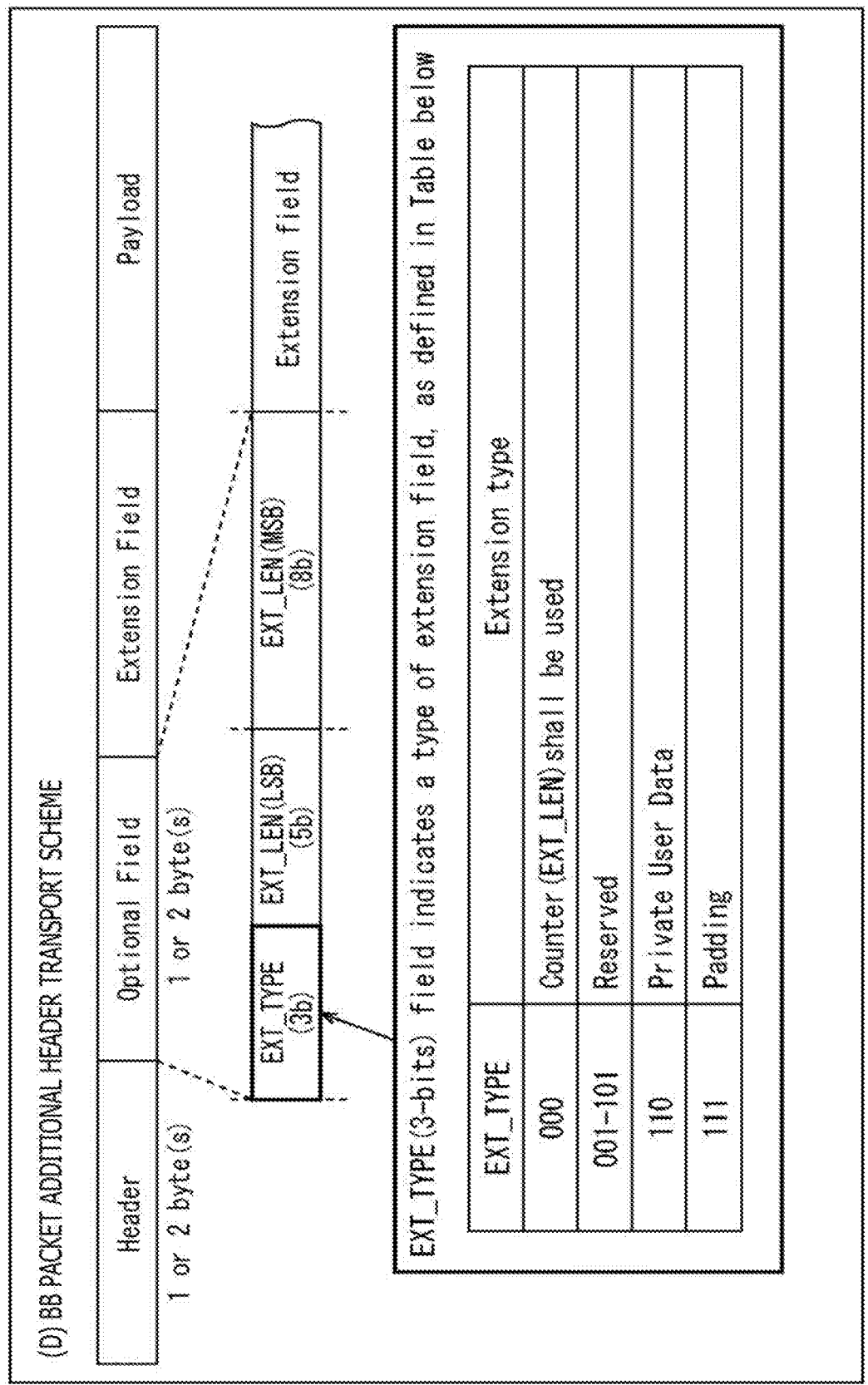
FIG. 21 is a diagram describing the BB packet additional header transport scheme.

Three-bit extension type information (EXT_TYPE) is set at the beginning of the optional field. In this type information, information regarding the extension field type (Extension type) is set as illustrated in FIG. 21.

That is, in the case where a counter of extension length information (EXT_Length(LSB)) is provided in the extension field, "000" is set in the extension type information. Also, in the case where private user data is provided in the extension field, "110" is set in the extension type information. Further, in the case where the extension field is padded, "111" is set in the extension type information. It should be noted that extension type information from "001" to "101" is an area for future extension (Reserved) in FIG. 21.

Then, in the BB packet additional header transport scheme, private user data is provided in the extension field (BB packet additional header) by setting "110" as extension type information. That is, in the case where the BB packet additional header transport scheme is used, "01," "10," or "11" is set as an optional flag (OPTI), causing an optional field and an extension field to be extended. Further, "110" is set as extension type information (EXT_TYPE) of the optional field, causing private user data to be provided in the extension field.

The structure illustrated in FIG. 22 can be provided in the extension field. Various pieces of information are provided for each piece of extension header index information (BBP Extension Header Index) in the structure illustrated in FIG. 22. For example, in the case where "000000" is set as extension header index information, it is possible to define the provision of private user data in the extension field.

A combination of a data ID (DATA_ID) and notification data (DATA) identified by that data ID is provided as this private user data. For example, in the case where data ID "0x00" is specified as illustrated in FIG. 22, tuning frequency data is provided. Also, for example, in the case where data ID "0x60" is specified, L1 basic information (L1-Basic) data is provided, and in the case where data ID "0x90" is specified, L1 detailed information (L1-Detail) data is provided. It should be noted that the private user data illustrated in FIG. 22 is merely an example, and other private user data may be provided.

Thus, by adopting the BB packet additional header transport scheme as a transport format for transporting private user data, it is possible to notify private user data (notification data) from the demodulation apparatus 211 at the preceding stage to the processing apparatus 212 at the succeeding stage in the reception system 20 by using an additional header of a BB packet.

(E) Generic Packet External Structure Scheme 1

Although a description will be given next of a Generic packet external structure scheme, there are two Generic packet external structure schemes. For this reason, common portions of the schemes will be described first with reference to FIG. 23, followed by the description of the Generic packet external structure scheme 1, the first scheme, with reference to FIGS. 24 to 26. Further, the Generic packet external structure scheme 2, the second scheme, will be described with reference to FIGS. 27 to 29.

(Configuration of the Reception System Common to the Two Schemes)

In the Generic packet external structure schemes, private user data (notification data) is transported by using an external structure of a Generic packet. Here, FIG. 23 schematically illustrates data processed by the demodulation apparatus 211 and the processing apparatus 212 of the reception system 20 in the case where the Generic packet external structure scheme is used.

Here, for example, in ATSC 3.0, the transmission system 10 on the transmitting side can deal with up to 64 PLPs for each given frequency band. On the other hand, it is necessary for the reception system 20 on the receiving side to receive up to four PLPs simultaneously. That is, the simultaneous reception of a plurality of PLPs by the reception system 20 on the receiving side makes it possible, for example, to provide voice with higher robustness and image of higher quality.

Figure 23:
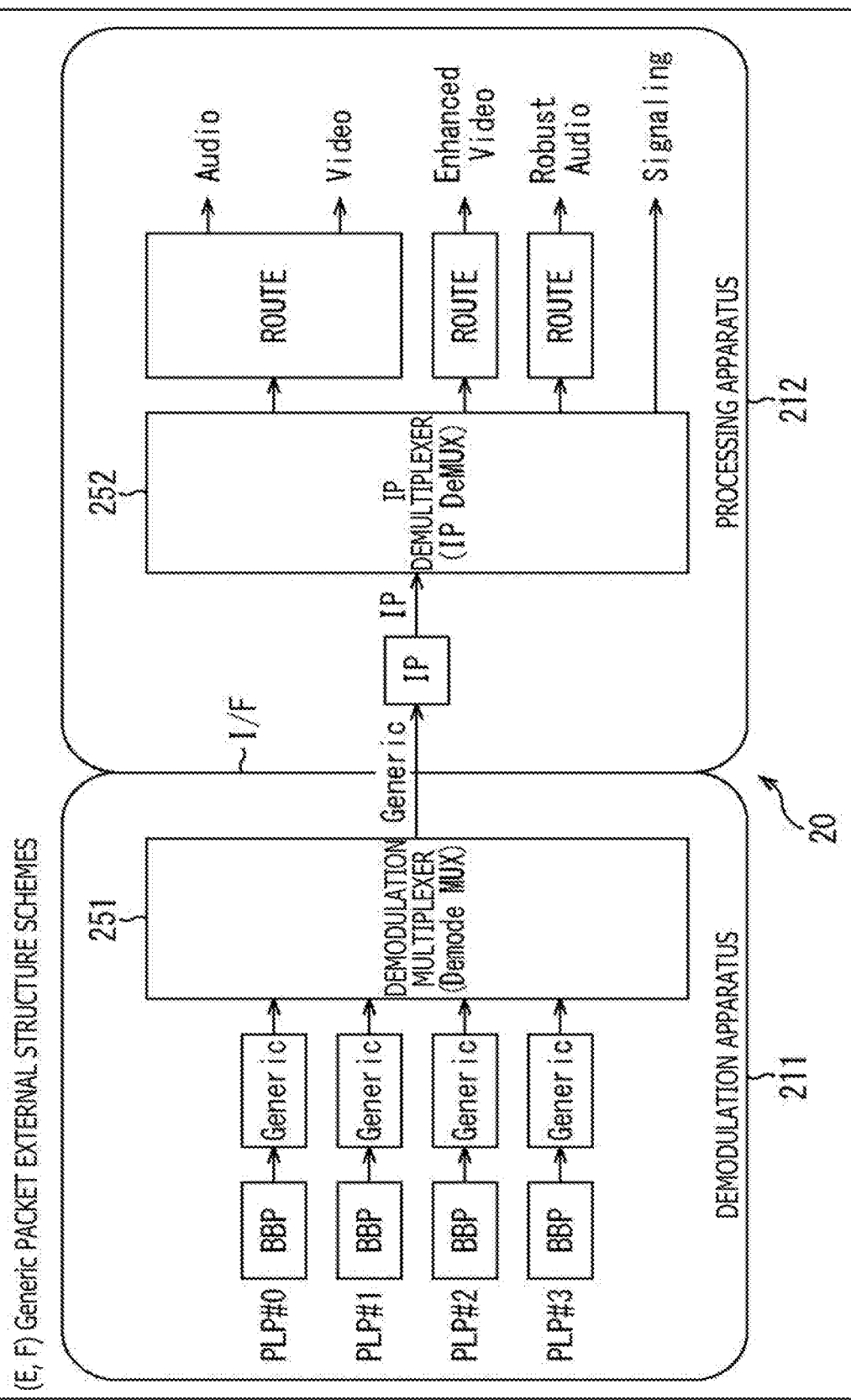
FIG. 23 is a diagram describing Generic packet external structure schemes 1 and 2.

In the reception system 20 illustrated in FIG. 23, the broadcast stream input thereto includes four PLPs from PLP #0 to PLP #3. Here, for example, LLS signaling, robust audio, video (base video) and audio, and enhanced video are transported by PLP #0, PLP #1, PLP #2, and PLP #3, respectively.

When a demodulation process is performed on PLP #0 to PLP #3 in the demodulation apparatus 211, the Generic packet is extracted from the BB packet and input to a demodulation multiplexer 251 for each PLP. The demodulation multiplexer 251 processes the Generic packet for each PLP and outputs the Generic packet to the processing apparatus 212 at the succeeding stage via the single interface (I/F) 213.

It should be noted, however, that when processing the Generic packet input for each PLP, the demodulation multiplexer 251 causes private user data to be added outside the Generic packet. That is, in the reception system 20, private user data is added outside the Generic packet by the demodulation apparatus 211. Also, here, the single interface (I/F) 213 is realized between the demodulation apparatus 211 and the processing apparatus 212 by notification of the PLP ID of data ID "0x01" by the demodulation apparatus 211 to the processing apparatus 212 as private user data.

In the processing apparatus 212, on the other hand, the IP packet (IP/UDP packet) is extracted from the Generic packet (Generic packet to which private user data has been added)

input from the demodulation apparatus 211 (demodulation multiplexer 251 thereof) via the single interface (I/F) 213 and input to an IP demultiplexer 252. Then, the IP demultiplexer 252 processes the IP packet, causing data which will be transported over a ROUTE session or the like to be output to the succeeding stage.

Here, the outside of the Generic packet from the demodulation apparatus 211 includes a PLP ID as private user data. For this reason, even if the Generic packet acquired from each of the PLPs (PLP #0 to PLP #3) is transported between the demodulation apparatus 211 and the processing apparatus 212 through the single interface (I/F) 213 in the reception system 20, it is possible to identify to which PLP the Generic packet (IP packet) input from the demodulation apparatus 211 belongs on the side of the processing apparatus 212 because of the PLP ID included in the private user data.

(Structure of the Generic Packet)

FIG. 24 is a diagram illustrating a packet structure when private user data is added externally to (outside) a Generic packet in the demodulation apparatus 211 of the reception system 20 in the case where the Generic packet external structure scheme 1 is used.

In FIG. 24, 'A' in FIG. 24 indicates the Generic packet structure. A Generic packet includes a Generic header and a payload. For example, private user data is added to this Generic packet, thereby allowing private user data to be added outside the Generic packet as illustrated in 'B' of FIG. 24.

(Syntax of Private User Data)

FIG. 25 is a diagram illustrating an example of syntax of private user data (Private_User_data) added outside the Generic packet in 'B' of FIG. 24.

The 8-bit Packet_type indicates the type corresponding to the packet type. For example, "101" is set as Packet_type for a Generic packet outside which private user data is added.

The 1-bit PC (Packet Configuration) indicates packet setting information. Also, the 1-bit HM (Header Mode) indicates the header mode. The 11-bit Length indicates the packet length of the Generic packet.

The 8-bit NUM_DATA indicates the number of pieces of private user data added outside the Generic packet. The 8-bit DATA_ID and the 8-bit DATA are provided in a private user data loop corresponding to this NUM_DATA. Here, a data ID is provided in the DATA_ID. Also, notification data is provided in the DATA. It should be noted, however, that notification data (DATA) is provided in accordance with the data length indicated by the 8-bit DATA_LENGTH.

Figure 26:
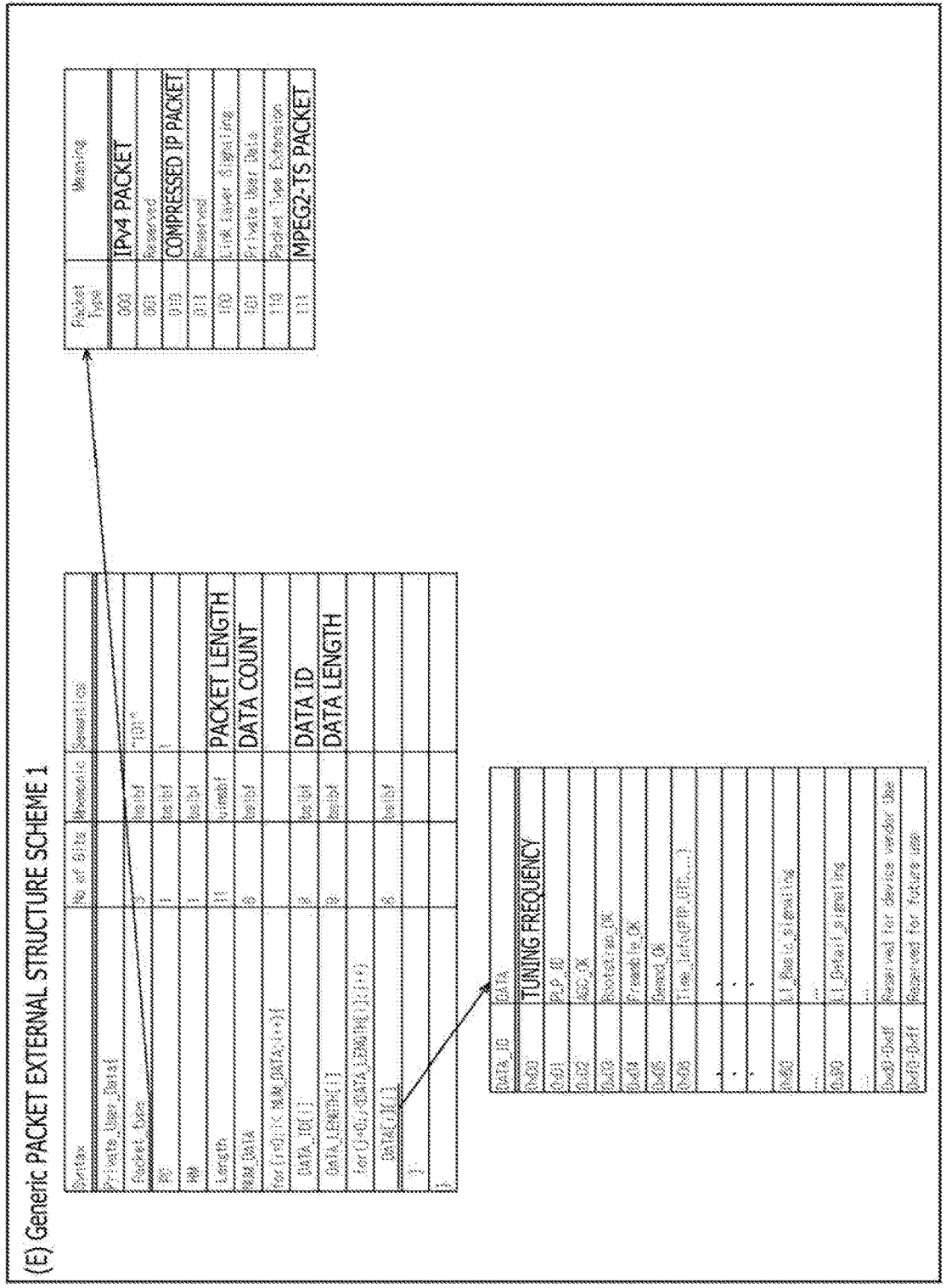
FIG. 26 is a diagram describing the Generic packet external structure scheme 1.

Thus, the loop is repeated in accordance with the number of pieces of private user data, and a combination of a data ID (DATA_ID) and notification data (DATA) identified by that data ID is provided. For example, in the case where data ID "0x00" is specified as illustrated in FIG. 26, tuning frequency data is provided. Also, for example, in the case where data ID "0x60" is specified, L1 basic information (L1-Basic) data is provided, and in the case where data ID "0x90" is specified, L1 detailed information (L1-Detail) data is provided.

Thus, by adopting the Generic packet external structure scheme 1 as a transport format for transporting private user data, it is possible to notify private user data (notification data) from the demodulation apparatus 211 at the preceding stage to the processing apparatus 212 at the succeeding stage in the reception system 20 by using an external structure of a Generic packet.

(F) Generic Packet External Structure Scheme 2

A description will be given next of the Generic packet external structure scheme 2 with reference to FIGS. 27 to 29.

(Structure of the Generic Packet)

FIG. 27 is a diagram illustrating a packet structure when private user data is added externally to (outside) a Generic packet in the demodulation apparatus 211 of the reception system 20 in the case where the Generic Packet External Structure Scheme 2 is Used.

In FIG. 27, 'A' in FIG. 27 indicates the Generic packet structure. A Generic packet includes a Generic header and a payload. Here, private user data is defined such that a Generic packet is included therein, thereby allowing for addition of the private user data outside the Generic packet as illustrated in 'B' of FIG. 27.

(Syntax of Private User Data)

FIG. 28 is a diagram illustrating an example of syntax of private user data (Private User data) including the Generic packet in 'B' of FIG. 27.

The 8-bit Packet type indicates the type corresponding to the packet type. For example, "100," "101," "110," or "111" is set as Packet type for a private user data packet including a Generic packet. For example, in the case where "100," "101," or "111" is set as Packet_type, an IPv4 packet, a compressed IP packet, or LLS signaling is included in the payload of the Generic packet. It should be noted that in the case where "110" is set as Packet_type, this means the extension of packet type (Packet Type Extension).

The 1-bit PC (Packet Configuration) indicates packet setting information. Also, the 1-bit HM (Header Mode) indicates the header mode. The 11-bit Length indicates the packet length of the Generic packet.

The 8-bit NUM_DATA indicates the number of pieces of private user data added outside the Generic packet. The 8-bit DATA_ID and the 8-bit DATA are provided in a private user data loop corresponding to this NUM_DATA. Here, a data ID is provided in the DATA_ID. Also, notification data is provided in the DATA. It should be noted, however, that notification data (DATA) is provided in accordance with the data length indicated by the 8-bit DATA_LENGTH.

Thus, the loop is repeated in accordance with the number of pieces of private user data, and a combination of a data ID (DATA_ID) and notification data (DATA) identified by that data ID is provided. For example, in the case where data ID "0x00" is specified as illustrated in FIG. 29, tuning frequency data is provided. Also, for example, in the case where data ID "0x60" is specified, L1 basic information (L1-Basic) data is provided, and in the case where data ID "0x90" is specified, L1 detailed information (L1-Detail) data is provided.

Referring back to FIG. 28, a Generic packet is provided in the 8-bit Generic_Packet_Payload. That is, in the case where the Generic packet external structure scheme 2 is used, the Generic packet is included in private user data.

Thus, by adopting the Generic packet external structure scheme 2 as a transport format for transporting private user data, it is possible to notify private user data (notification data) from the demodulation apparatus 211 at the preceding stage to the processing apparatus 212 at the succeeding stage in the reception system 20 by using an external structure of a Generic packet.

(G) BB Packet External Structure Scheme

A description will be given next of the BB packet external structure scheme with reference to FIGS. 30 to 33. In this BB packet external structure scheme, private user data (notification data) is transported by using an external structure of a BB packet.

(Configuration of the Reception System in the Case of the BB Packet External Structure Scheme)

Here, FIG. 30 schematically illustrates data processed by the demodulation apparatus 211 and the processing apparatus 212 of the reception system 20 in the case where the BB packet external structure scheme is used.

It should be noted that, in the reception system 20 illustrated in FIG. 30, the broadcast stream input thereto includes four PLPs from PLP #0 to PLP #3 as in the reception system 20 illustrated in FIG. 23. Here, for example, LLS signaling, robust audio, video (base video) and audio, and enhanced video are transported by PLP #0, PLP #1, PLP #2, and PLP #3, respectively.

When a demodulation process is performed on PLP #0 to PLP #3 in the demodulation apparatus 211, a BB packet is extracted and input to a demodulation multiplexer 253 for each PLP. The demodulation multiplexer 253 processes the BB packet input for each PLP and outputs the BB packet to the processing apparatus 212 at the succeeding stage via the single interface (I/F) 213.

It should be noted, however, that when processing the BB packet input for each PLP, the demodulation multiplexer 253 causes private user data to be added outside the BB packet. That is, in the reception system 20, private user data is added outside the BB packet by the demodulation apparatus 211. Also, here, the single interface (I/F) 213 is realized between the demodulation apparatus 211 and the processing apparatus 212 by notification of the PLP ID of data ID "0x01" by the demodulation apparatus 211 to the processing apparatus 212 as private user data.

In the processing apparatus 212, on the other hand, the BB packet (BB packet to which private user data has been added) input from the demodulation apparatus 211 (demodulation multiplexer 253 thereof) via the single interface (I/F) 213 is input to an IP demultiplexer 254. The BBP demultiplexer 254 processes the BB packet, thereby causing a Generic packet to be extracted from the BB packet. Then, the IP packet (IP/UDP packet) extracted from the Generic packet is processed, thereby causing data which will be transported over a ROUTE session or the like to be output to the succeeding stage.

Here, a PLP ID is included outside the BB packet from the demodulation apparatus 211 as private user data. For this reason, even if the BB packet acquired from each of the PLPs (PLP #0 to PLP #3) is transported between the demodulation apparatus 211 and the processing apparatus 212 through the single interface (I/F) 213 in the reception system 20, it is possible to identify to which PLP the BB packet (IP packet) input from the demodulation apparatus 211 belongs on the side of the processing apparatus 212 because of the PLP ID included in the private user data.

(Structure of the BB Packet)

FIG. 31 is a diagram illustrating a packet structure when private user data is added externally to (outside) a BB packet in the demodulation apparatus 211 of the reception system 20 in the case where the BB packet external structure scheme is used.

In FIG. 31, 'A' in FIG. 31 indicates the BB packet structure. A BB packet includes a BBP header and a payload. For example, private user data is added to this BB packet, thereby allowing the private user data to be added outside the BB packet as illustrated in 'B' of FIG. 31.

(Structure of Private User Data)

Figure 32:
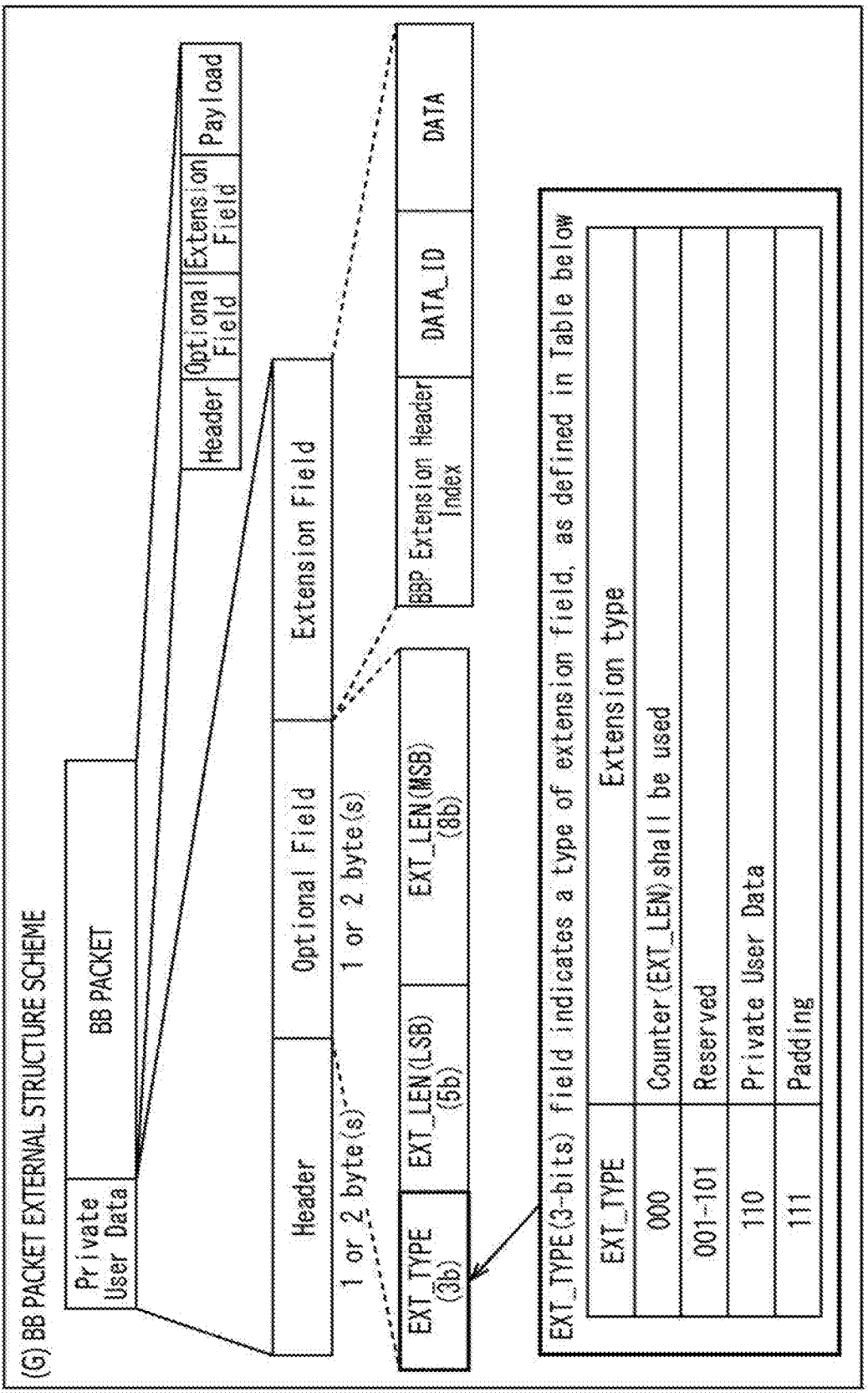
FIG. 32 is a diagram describing the BB packet external structure scheme.

FIG. 32 illustrates a structure of private user data added outside a BB packet.

In FIG. 32, a 1- or 2-byte header, an optional field, and an extension field can be provided in the private user data added outside the BB packet.

Here, 3-bit extension type information (EXT_TYPE) is set at the beginning of the optional field. Information regarding the extension field type (Extension type) is set in this type information as illustrated in FIG. 32.

That is, in the case where private user data (data ID and notification data) is provided in the extension field, "110" is set in the extension type information. Then, in the BB packet additional header transport scheme, private user data (data ID and notification data) is provided in the extension field by setting "110" as extension type information.

Figure 33:
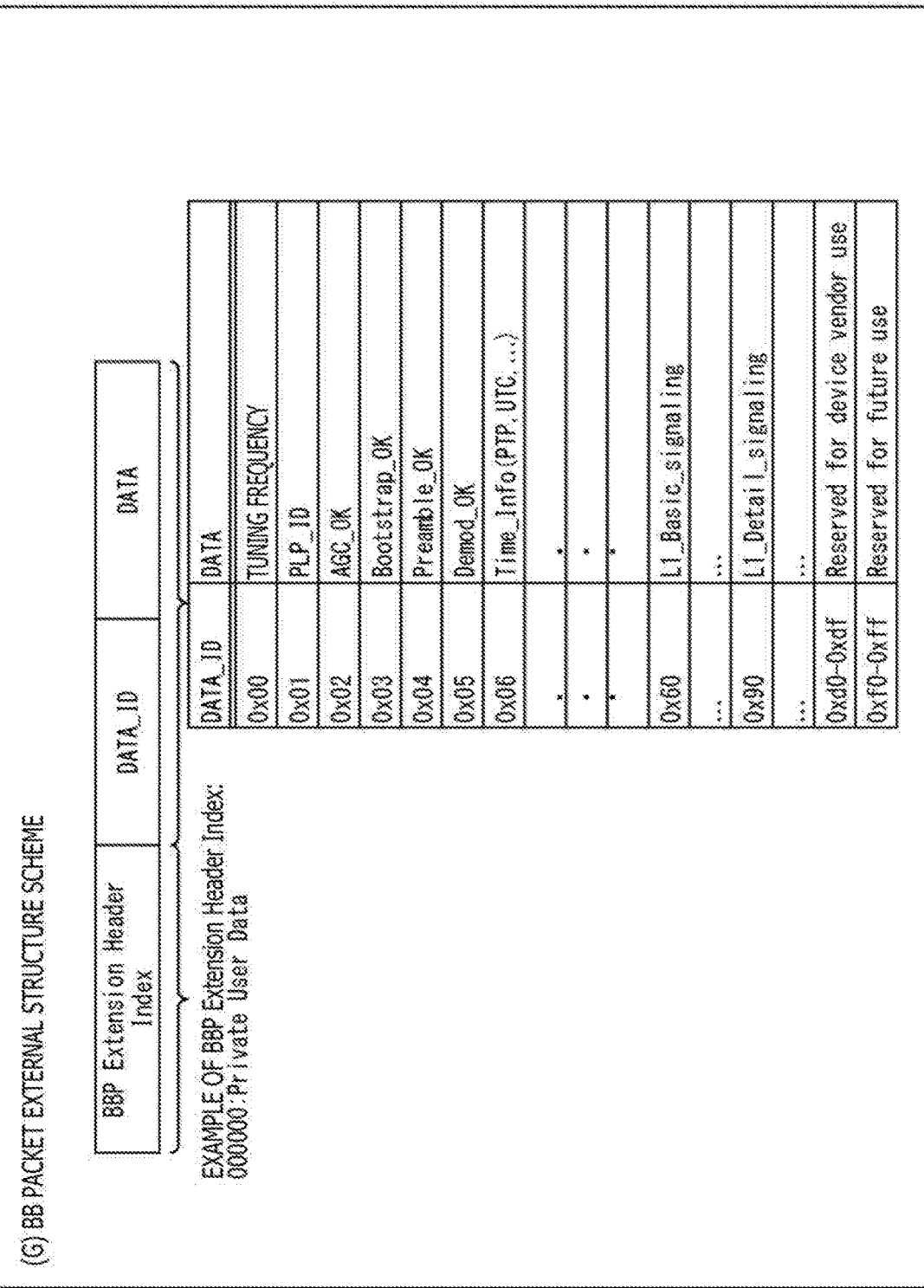
FIG. 33 is a diagram describing the BB packet external structure scheme.

The structure illustrated in FIG. 33 can be provided in the extension field. In the structure illustrated in FIG. 33, various pieces of information are provided for each piece of extension header index information (BBP Extension Header Index). For example, in the case where "000000" is set as extension header index information, it is possible to define the provision of private user data in the extension field.

A combination of a data ID (DATA_ID) and notification data (DATA) identified by that data ID is provided as this private user data. For example, in the case where data ID "0x00" is specified as illustrated in FIG. 33, tuning frequency data is provided. Also, for example, in the case where data ID "0x60" is specified, L1 basic information (L1-Basic) data is provided, and in the case where data ID "0x90" is specified, L1 detailed information (L1-Detail) data is provided. It should be noted that the private user data illustrated in FIG. 33 is merely an example, and other private user data may be provided.

Thus, by adopting the BB packet external structure scheme as a transport format for transporting private user data, it is possible to notify private user data (notification data) from the demodulation apparatus 211 at the preceding stage to the processing apparatus 212 at the succeeding stage in the reception system 20 by using an external structure of a BB packet.

(H) IP Packet Transport Scheme

Finally, a description will be given of the IP packet transport scheme with reference to FIGS. 34 and 35. In this IP packet transport scheme, private user data (notification data) is transported by using an IP packet (IP/UDP packet).

(Configuration Example of the Reception System in the Case of the IP Packet Transport Scheme)

Figure 34:
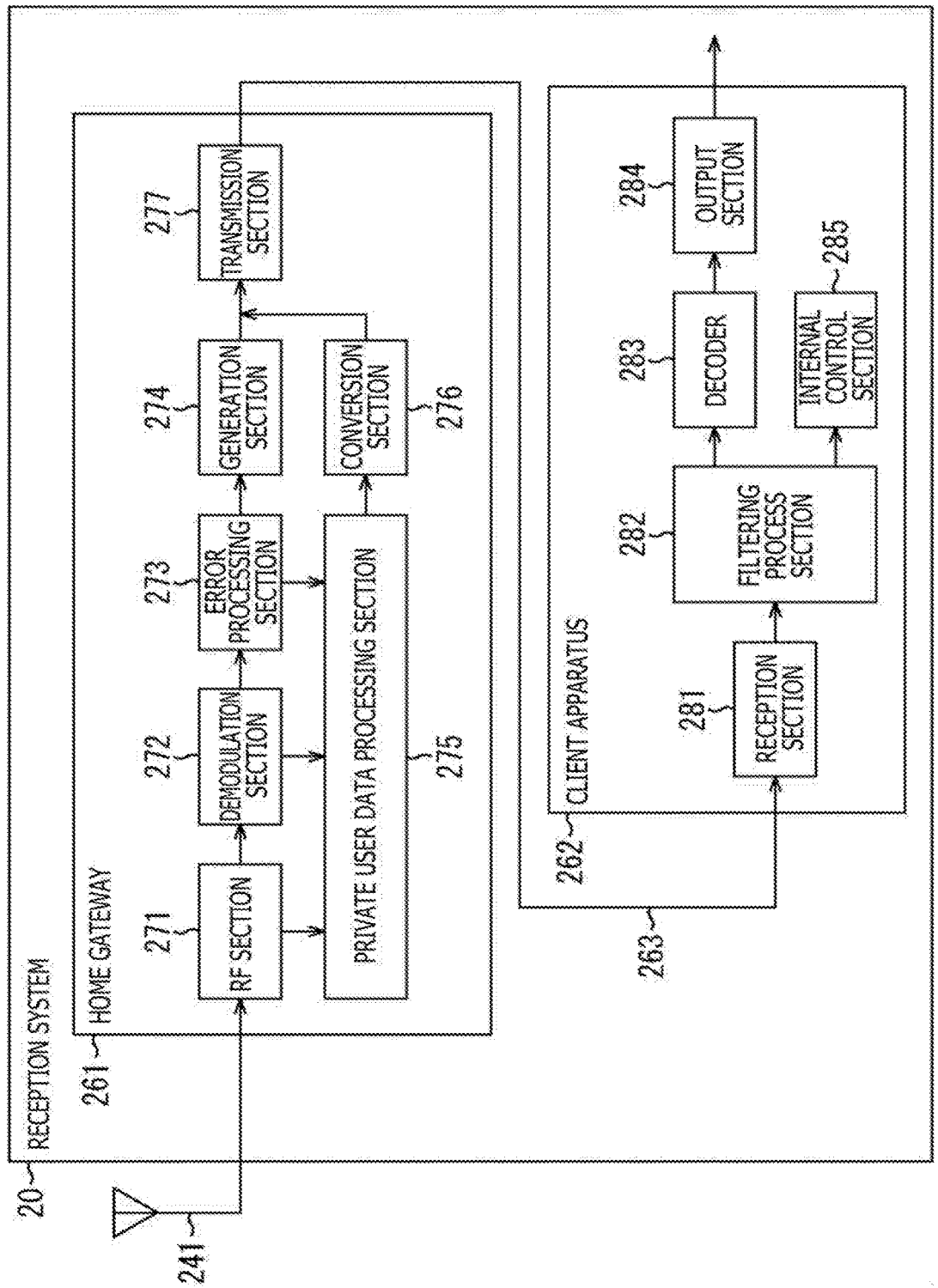
FIG. 34 is a diagram describing an IP packet transport scheme.

Here, FIG. 34 illustrates a configuration example of the reception system 20 in the case where the IP packet transport scheme is adopted.

In FIG. 34, the reception system 20 includes the home gateway 261 at the preceding stage to the client apparatus 262 at the succeeding stage. Data transport via a network 263 takes place between the home gateway 261 and the client apparatus 262. That is, in the reception system 20, the home gateway 261 such as home server or TV receiver and the client apparatus 262 such as smartphone or tablet terminal are connected to the network 263 such as wireless LAN (Local Area Network) in homes, thereby building a so-called home network system.

The home gateway 261 receives a digital broadcast signal sent from the transmission system 10 via the transport path 30 and processes content included in a broadcast stream. The home gateway 261 sends (delivers) content, acquired by processing the broadcast stream, to the client apparatus 262 via the network 263. On the other hand, the client apparatus 262 receives content sent via the network 263 and processes (reproduces) the content.

In FIG. 34, the home gateway 261 includes an RF section 271, a demodulation section 272, an error processing section 273, a generation section 274, a private user data processing section 275, a conversion section 276, and a transmission section 277.

The RF section 271, the demodulation section 272, and the error processing section 273 perform a demodulation process (e.g., OFDM demodulation), an error correction coding process (e.g., LDPC decoding, BCH decoding, or other decoding), and other processes as do the RF section 221, the demodulation section 222, and the error processing section 223 illustrated in FIG. 3, causing a physical layer frame to be processed. The data processed by the RF section 271 through the error processing section 273 (reception data) is supplied to the generation section 274.

Also, the RF section 271, the demodulation section 272, and the error processing section 273 supplies, to the private user data processing section 275, notification data to be notified to the client apparatus 262 at the succeeding stage that is acquired as a result of performance of processes by the respective sections. Here, notification data includes, for example, tuning information used during tuning, information regarding state of the demodulation process, information regarding error of the demodulation process, or information regarding signaling acquired by the demodulation process or modulation parameters, and other information.

The private user data processing section 275 processes notification data supplied from the RF section 221, the demodulation section 222, or the error processing section 223 and causes the notification data to be inserted into data processed by the RF section 271 through the error processing section 273 (reception data) as private user data.

It should be noted, however, that the generation section 274 performs a process of extracting a Generic packet from a BB packet and further converting the data extracted from the Generic packet into an ISO BMFF (Base Media File Format) file format by processing the data processed by the RF section 271 through the error processing section 273. Also, the generation section 274 places video and audio data, converted into ISO BMFF file format, into an IP packet (IP/UDP packet) and supplies the IP packet to the transmission section 277.

For this reason, the private user data processing section 275 supplies the processed notification data to the conversion section 276, thereby causing the notification data to be converted into ISO BMFF file format and placed into an IP packet (IP/UDP packet) by the conversion section 276. The IP packet holding the notification data from the conversion section 276 is supplied to the transmission section 277. As a result, the notification data processed by the private user data processing section 275 is converted into a transportable format together with reception data acquired from the demodulation process as private user data.

The IP packet from the generation section 274 and the IP packet from the conversion section 276 are supplied to the transmission section 277. The transmission section 277 sends (delivers) an IP packet (IP/UDP packet) including reception data or notification data to the client apparatus 262 via the network 263.

The home gateway 261 is thus configured.

On the other hand, in FIG. 34, the client apparatus 262 includes a reception section 281, a filtering process section 282, a decoder 283, an output section 284, and an internal control section 285.

The reception section 281 receives an IP packet sent from the home gateway 261 via the network 263 and supplies the IP packet to the filtering process section 282. It should be noted that this IP packet (IP/UDP packet) has reception data acquired by the demodulation process and private user data (notification data).

The filtering process section 282 performs a filtering process of the IP packet supplied from the reception section 281. As a result of this filtering process, the IP packet holding reception data is supplied to the decoder 283, and the IP packet holding private user data (notification data) is supplied to the internal control section 285.

Video and audio component data, acquired from the reception data (in ISO BMFF file format) placed in the IP packet supplied from the filtering process section 282, is supplied to the decoder 283. The decoder 283 decodes the video and audio component data and supplies the data, acquired therefrom, to the output section 284.

The output section 284 outputs, of the data supplied from the decoder 283, video data to a display section (not illustrated) and audio data to a speaker (not illustrated). As a result, the client apparatus 262 of the reception system 20 reproduces the content image and voice delivered from the home gateway 261.

Also, the private user data (notification data) (in ISO BMFF file format) placed in the IP packet supplied from the filtering process section 282 is supplied to the internal control section 285. The internal control section 285 performs a process appropriate to the notification data notified (transported) as private user data.

Here, for example, tuning information used during tuning, information regarding state of the demodulation process, information regarding error of the demodulation process, or information regarding signaling acquired by the demodulation process or modulation parameters, and so on is included as notification data. The internal control section 285 controls the operation of each section of the client apparatus 262 on the basis of such notification data.

The client apparatus 262 is thus configured.

(Structure of the IP Packet)

Figure 35:
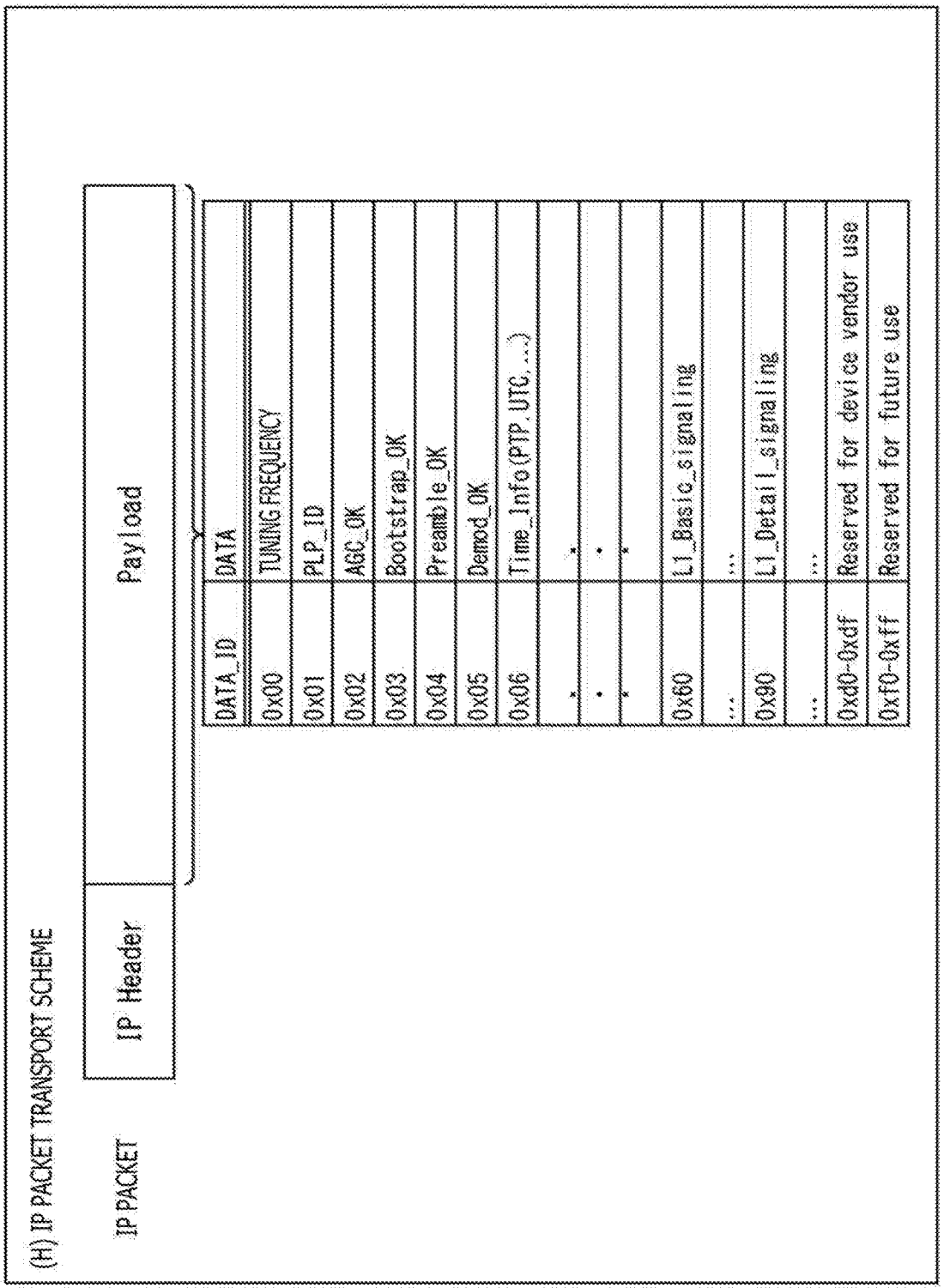
FIG. 35 is a diagram describing the IP packet transport scheme.

FIG. 35 is a diagram illustrating a packet structure when private user data is placed in an IP packet (IP/UDP packet) in the home gateway 261 of the reception system 20 in the case where the IP packet transport scheme is used.

In FIG. 35, the IP packet includes an IP header and a payload. A combination of a data ID (DATA_ID) and notification data (DATA) identified by that data ID is provided this IP packet payload as private user data. For example, in the case where data ID "0x00" is specified as illustrated in FIG. 35, tuning frequency data is provided. Also, for example, in the case where data ID "0x60" is specified, L1 basic information (L1-Basic) data is provided, and in the case where data ID "0x90" is specified, L1 detailed information (L1-Detail) data is provided.

Thus, by adopting the IP packet transport scheme as a transport format for transporting private user data, it is possible to notify private user data (notification data) from the demodulation apparatus 211 at the preceding stage to the processing apparatus 212 at the succeeding stage in the reception system 20 by using an IP packet (IP/UDP packet).

It should be noted that although, in FIG. 34, the case of configuring a home network system is described as a configuration of the reception system 20 in the case where the IP packet transport scheme is adopted, a home network system is merely an example, and other system such as internet delivery system may be configured. For example, in the case where an internet delivery system is adopted as the reception system 20, content delivered from a delivery server (content redelivery apparatus) corresponding to the home gateway 261 illustrated in FIG. 34 is received via the network 263 such as the Internet by information equipment such as the client apparatus 262 (e.g., smartphone or tablet terminal) to be reproduced.

<4. Flow of Processes Performed by Reception System>

Figure 36:
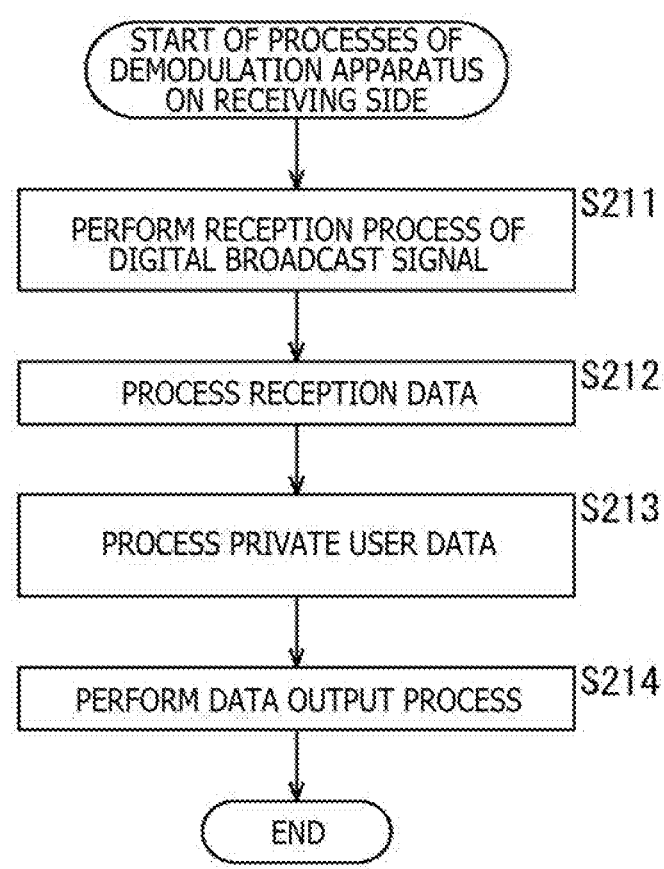
FIG. 36 is a flowchart describing a flow of processes performed by a demodulation apparatus on a receiving side.
Figure 37:
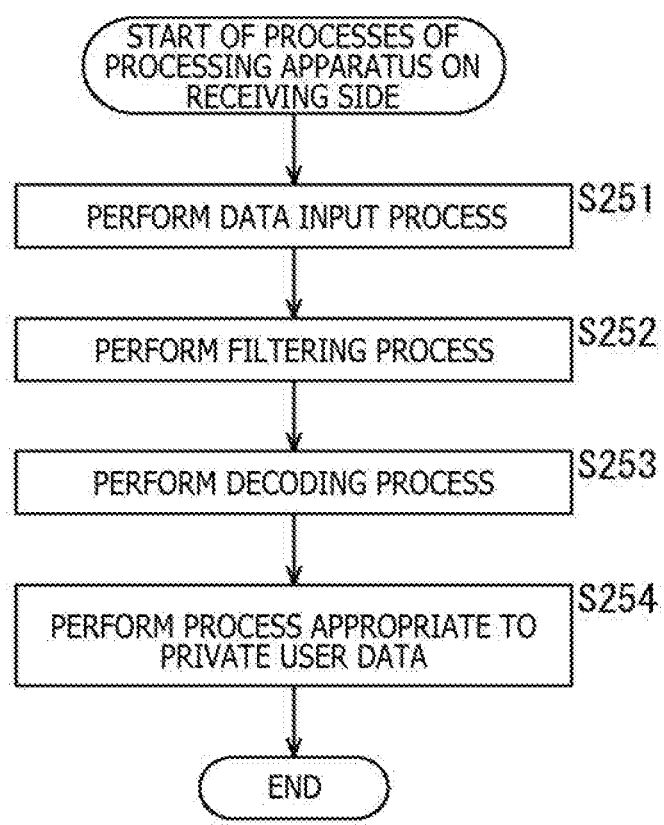
FIG. 37 is a flowchart describing a flow of processes performed by a processing apparatus on the receiving side.

A description will be given next of a flow of processes performed by the demodulation apparatus 211 and the processing apparatus 212 included in the reception system 20 illustrated in FIG. 3 with reference to the flowcharts illustrated in FIGS. 36 and 37.

(Processes of the Demodulation Apparatus on the Transmitting Side)

A description will be given first of the processes of the demodulation apparatus on the transmitting side performed by the demodulation apparatus 211 at the preceding stage with reference to the flowchart illustrated in FIG. 36.

In step S211, the RF section 221 of the demodulation apparatus 211 performs a reception process of a digital broadcast signal. Also, in step S212, the demodulation section 222 and the error processing section 223 of the demodulation apparatus 211 perform a demodulation process and an error correction decoding process of the signal acquired by the reception process in step S211. As a result, reception data is processed.

In step S213, the private user data processing section 224 of the demodulation apparatus 211 processes notification data to be notified to the processing apparatus 212 at the succeeding stage that is acquired by the processes in steps S211 and S212 and causes the notification data to be inserted into the data acquired by the processes in step S212 as private user data. That is, the private user data processing section 224 processes notification data to be notified to the processing apparatus 212 at the succeeding stage and transforms the notification data into a transportable format together with reception data acquired from the demodulation process. The transport scheme illustrated in FIG. 13 described above can be adopted as this transport scheme.

In step S214, the output I/F 225 outputs private user data (notification data), acquired by the process in step S213, to the processing apparatus 212 at the succeeding stage together with reception data acquired by the process in step S212 via the interface (I/F) 213.

Thus, the flow of processes of the demodulation apparatus on the transmitting side has been described.

(Processes of the Processing Apparatus on the Receiving Side)

A description will be given next of the processes of the processing apparatus on the receiving side performed by the processing apparatus 212 at the succeeding stage with reference to the flowchart illustrated in FIG. 37.

In step S251, the input I/F 231 supplies, to the filtering process section 232, data input from the demodulation apparatus 211 at the preceding stage via the interface (I/F) 213.

In step S252, the filtering process section 232 performs a filtering process of data (a packet holding data) supplied from the input I/F 231. As a result of this filtering process, reception data (a packet holding reception data) is supplied to the decoder 233, and private user data (notification data) (a packet holding private user data) is supplied to the internal control section 235.

In step S253, video and audio component data, acquired by the process in step S252, is decoded. Then, the output section 234 outputs, of the data supplied from the decoder 233, video data to a display section (not illustrated) and audio data to a speaker (not illustrated). As a result, the reception system 20 reproduces the content image and voice delivered from the transmission system 10.

In step S254, the internal control section 235 performs a process appropriate to the private user data (notification data) acquired by the process in step S252. Here, for example, tuning information used during tuning, information regarding state of the demodulation process, information regarding error of the demodulation process, or information regarding signaling acquired by the demodulation process or modulation parameters, and so on is included as notification data. The internal control section 235 controls the operation of each section of the processing apparatus 212 on the basis of such notification data.

Thus, the flow of processes of the processing apparatus on the receiving side has been described.

<5. Modification Example>

Although, in the above description, ATSC (ATSC 3.0 in particular), a scheme adopted, for example, in the United States, is described as a digital broadcasting standard, the present technology may be applied to ISDB (Integrated Services Digital Broadcasting), a scheme adopted, for example, in Japan and DVB (Digital Video Broadcasting), a scheme adopted in European nations, and so on. Also, although, a description is given in the above description by citing ATSC 3.0 that adopts the IP transport scheme as an example, the transport scheme to which the present technology is applied is not limited to the IP transport scheme, and the present technology may be applied to other schemes such as MPEG2-TS (Transport Stream).

Also, the present technology is applicable, among digital broadcasting, not only to terrestrial broadcasting and satellite broadcasting such as broadcasting satellite (BS) and communications satellite (CS) but also to wired broadcasting such as cable TV (CATV).

Further, the signaling, packet, and other names described above are merely examples, and there are cases in which other names may be used. It should be noted, however, that these differences in name are differences in formality and that there is no difference in substantial content of target signaling or packet. For example, a BBP (Baseband Packet) may be referred to as a BBS (Baseband Stream). Also, for example, a Generic packet may be an L2 packet of layer 2 and be referred to as an ALP (ATSC Link-layer Protocol) packet.

Also, although, in the above description, time information prescribed by PTP and UTC is described as time information, the present technology is not limited thereto, and arbitrary time information such as time information prescribed in NTP (Network Time Protocol) and 3GPP (Third Generation Partnership Project), time information included in GPS (Global Positioning System) information, other time information in a format uniquely determined, and so on can be used.

It should be noted that the present technology is applicable to a given standard (standard other than digital broadcasting standard) prescribed on the premise that transport paths other than broadcasting network, i.e., communication lines (communication networks) such as the Internet and telephone network, are used as transport paths. In this case, a communication line such as the Internet or telephone network is used as the transport path 30 of the transport system 1 (FIG. 1), and a server provided on the Internet can be used as the transmission system 10. Then, the reception system 20 is provided with a communication function. As a result, the transmission system 10 (server) performs processes in response to a request from the reception system 20. Also, the reception system 20 processes data sent from the transmission system 10 (server) via the transport path 30 (communication line).

<6. Configuration of Computer>

The series of processes described above may be performed by hardware or software. When the series of processes are performed by software, the program included in the software is installed to a computer. FIG. 38 is a diagram illustrating a hardware configuration example of a computer for performing the above series of processes using the program.

In a computer 1000, a CPU (Central Processing Unit) 1001, a ROM (Read Only Memory) 1002, and a RAM (Random Access Memory) 1003 are connected to each other by a bus 1004. An input/output interface 1005 is further connected to the bus 1004. An input section 1006, an output section 1007, a recording section 1008, a communication section 1009, and a drive 1010 are connected to the input/output interface 1005.

The input section 1006 includes a keyboard, a mouse, a microphone, and so on. The output section 1007 includes a display, a speaker, and so on. The recording section 1008 includes a hard disk, a non-volatile memory, and so on. The communication section 1009 includes a network interface and so on. The drive 1010 drives a removable medium 1011 such as magnetic disk, optical disc, magneto-optical disk, or semiconductor memory.

In the computer 1000 thus configured, the CPU 1001 loads, for example, the program recorded in the ROM 1002 or the recording section 1008 into the RAM 1003 via the input/output interface 1005 and the bus 1004 for execution, thereby allowing the above series of processes to be performed.

The program executed by the computer 1000 (CPU 1001) can be provided recorded, for example, in the removable medium 1011 as a packaged medium or the like. Alternatively, the program can be provided via a wired or wireless transport medium such as local area network, the Internet, and digital satellite broadcasting.

In the computer 1000, the program can be installed to the recording section 1008 via the input/output interface 1005 by inserting the removable medium 1011 into the drive 1010. Alternatively, the program can be received by the communication section 1009 via a wired or wireless transport medium and installed to the recording section 1008. In addition to the above, the program can be installed, in advance, to the ROM 1002 or the recording section 1008.

Here, in the present specification, the processes performed by the computer in accordance with the program need not necessarily be performed chronologically in accordance with the sequence described as a flowchart. That is, the processes performed by the computer in accordance with the program include those that are performed in parallel or individually (e.g., parallel processes or object-based processes). Also, the program may be processed by a single computer (processor) or by a plurality of computers in a distributed manner.

It should be noted that embodiments of the present technology are not limited to that described above and can be modified in various ways without departing from the gist of the present technology.

It should be noted that the present technology can have the following configurations:

(1)

A data processing apparatus, a data processing apparatus at a preceding stage, including:

a reception section adapted to receive a digital broadcast signal;

a processing section adapted to process, of data acquired by a demodulation process of the digital broadcast signal, notification data to be notified to a data processing apparatus at a succeeding stage that performs a process succeeding to the demodulation process and transform the notification data into a transportable format together with reception data acquired from the digital broadcast signal; and an output section adapted to output the notification data to the data processing apparatus at the succeeding stage together with the reception data.

(2)

The data processing apparatus of feature (1), in which the processing section adds the notification data to an area reserved in advance in a digital broadcasting standard.

(3)

The data processing apparatus of feature (2), in which the processing section adds the notification data together with identification information that can identify the notification data.

(4)

The data processing apparatus of feature (1), in which the notification data includes at least any one of tuning information used during tuning, information regarding state of the demodulation process, information regarding error of the demodulation process, and information regarding signaling acquired by the demodulation process or modulation parameters.

(5)

The data processing apparatus of feature (4), in which the notification data further includes data uniquely extended by a manufacturer manufacturing the data processing apparatus at the preceding stage or the data processing apparatus at the succeeding stage.

(6)

The data processing apparatus of any one of features (1) to (5), in which the data processing apparatus at the preceding stage is a demodulation apparatus that performs a demodulation process, the data processing apparatus at the succeeding stage is a processing apparatus that performs a process succeeding to the demodulation process, and the demodulation apparatus and the processing apparatus are provided in same equipment and connected by a single interface.

(7)

The data processing apparatus of feature (6), in which the notification data is placed in a packet extension area that holds the reception data.

(8)

The data processing apparatus of feature (6), in which the digital broadcast signal supports an IP transport scheme using an IP (Internet Protocol) packet including a UDP (User Datagram Protocol) packet, and the notification data is added to an additional header of a first transport packet for transporting the IP packet, signaling included in the first transport packet, a header of the signaling, an additional header of a second transport packet for transporting the first transport packet, an extension area outside the first transport packet, or an extension area outside the second transport packet.

(9)

The data processing apparatus of any one of features (1) to (5), in which the data processing apparatus at the preceding stage is an information processing apparatus that delivers content acquired from the digital broadcast signal, the data processing apparatus at the succeeding stage is a terminal apparatus that reproduces the content delivered from the information processing apparatus, and the information processing apparatus and the terminal apparatus are configured as separate apparatuses and connected via a network.

(10)

The data processing apparatus of feature (9), in which
the digital broadcast signal supports an IP transport scheme using an IP packet including a UDP packet,
the data processing apparatus at the preceding stage further includes an IP conversion section adapted to convert a packet holding the reception data and a packet holding the notification data into an IP packet, and
the output section sends, to the data processing apparatus at the succeeding stage, the notification data held in the IP packet together with the reception data held in the IP packet via the network.

(11)

The data processing apparatus of any one of features (1) to (10), in which
the data processing apparatus at the succeeding stage performs a process appropriate to the notification data output from the data processing apparatus at the preceding stage.

(12)

A data processing method of a data processing apparatus at a preceding stage, the data processing method including the steps of:
by the data processing apparatus at the preceding stage receiving a digital broadcast signal;
processing, of data acquired by a demodulation process of the digital broadcast signal, notification data to be notified to a data processing apparatus at a succeeding stage that performs a process succeeding to the demodulation process and transforming the notification data into a transportable format together with reception data acquired from the digital broadcast signal; and
outputting the notification data to the data processing apparatus at the succeeding stage together with the reception data.

REFERENCE SIGNS LIST

1 Transport system
10 Transmission system
20 Reception system
30 Transport path
111 Component processing section
112 Signaling processing section
113 Packet processing section
114 Modulation Processing Section
115 RF section
211 Demodulation apparatus
212 Processing apparatus
213 Interface
222 Demodulation section
223 Error processing section
224 Private user data processing section
225 Output I/F
231 Input I/F
232 Filtering process section
233 Decoder
234 Output section
235 Internal control section
251 Demodulation multiplexer
252 IP demultiplexer
253 Demodulation multiplexer
254 BBP demultiplexer
261 Home gateway
262 Client apparatus
263 Network
271 RF section
272 Demodulation section
273 Error processing section
274 Generation section
275 Private user data processing section
276 Conversion section
277 Transmission section
281 Reception section
282 Filtering process section
283 Decoder
284 Output section
285 Internal control section
1000 Computer
1001 CPU

The invention claimed is:

1. A data processing apparatus comprising:
first processing circuitry configured to:
receive a digital broadcast signal via an antenna;
perform a demodulation process on the digital broadcast signal to obtain reception data;
generate notification data to be transmitted to second processing circuitry, the notification data indicating errors or successes of various stages of the demodulation process performed by the first processing circuitry or a setting of the first processing circuitry for performing the demodulation process;
generate a data packet that encapsulates the reception data and the notification data; and
output the generated data packet that encapsulates the reception data and the notification data to the second processing circuitry via an interface for further processing of the reception data; and
the second processing circuitry that is configured to process the reception data,
wherein
the first processing circuitry and the second processing circuitry are connected by the interface which is a single interface therebetween,
the digital broadcast signal supports an Internet Protocol (IP) transport scheme using an IP packet including a User Datagram Protocol (UDP) packet, and
the data packet is generated by adding the notification data to an additional header of a first transport packet for transporting the IP packet, to signaling included in the first transport packet, to a header of the signaling, to an additional header of a second transport packet for transporting the first transport packet, to an extension area outside the first transport packet, or to an extension area outside the second transport packet.

2. The data processing apparatus of claim 1, wherein
the data packet complies with a digital broadcasting standard for carrying the reception data, and
the first processing circuitry is configured to generate the data packet by adding the notification data to an area in the data packet reserved in advance according to the digital broadcasting standard.

3. The data processing apparatus of claim 2, wherein
the first processing circuitry is configured to add the notification data together with identification information that identifies the notification data to the area in the data packet.

4. The data processing apparatus of claim 1, wherein
the notification data includes at least one of tuning information used during tuning, information regarding state of the demodulation process, information regarding error of the demodulation process, information regarding signaling acquired by the demodulation process, and information regarding modulation parameters.

5. The data processing apparatus of claim 4, wherein the notification data further includes data proprietarily defined by a manufacturer manufacturing the data processing apparatus.

6. The data processing apparatus of claim 1, wherein the notification data is placed in a packet extension area of the data packet that holds the reception data.

7. The data processing apparatus of claim 1, wherein the second processing circuitry is configured to perform a process appropriate to the notification data output from the first processing circuitry.

8. A data processing method, comprising:
receiving, by first processing circuitry of a data processing apparatus via an antenna, a digital broadcast signal;
performing a demodulation process on the digital broadcast signal by the first processing circuitry to obtain reception data;
generating, by the first processing circuitry, notification data to be transmitted to second processing circuitry of the data processing apparatus, the notification data indicating errors or successes of various stages of the demodulation process performed by the first processing circuitry or a setting of the first processing circuitry for performing the demodulation process;
generating, by the first processing circuitry, a data packet that encapsulates the reception data and the notification data; and
outputting the generated data packet that encapsulates the reception data and the notification data to the second processing circuitry via an interface for further processing of the reception data;
wherein
the first processing circuitry and the second processing circuitry are connected by the interface which is a single interface therebetween,
the digital broadcast signal supports an Internet Protocol (IP) transport scheme using an IP packet including a User Datagram Protocol (UDP) packet, and
the data packet is generated by adding the notification data to an additional header of a first transport packet for transporting the IP packet, to signaling included in the first transport packet, to a header of the signaling, to an additional header of a second transport packet for transporting the first transport packet, to an extension area outside the first transport packet, or to an extension area outside the second transport packet.

9. The data processing method of claim 8, wherein
the data packet complies with a digital broadcasting standard for carrying the reception data, and
the generating the data packet comprises adding the notification data to an area in the data packet reserved in advance according to the digital broadcasting standard.

10. The data processing method of claim 9, wherein
the generating the data packet comprises adding the notification data together with identification information that identifies the notification data to the area in the data packet.

11. The data processing method of claim 8, wherein
the notification data includes at least one of tuning information used during tuning, information regarding state of the demodulation process, information regarding error of the demodulation process, information regarding signaling acquired by the demodulation process, and information regarding modulation parameters.

12. The data processing method of claim 8, wherein
the notification data is placed in a packet extension area of the data packet that holds the reception data.

13. A data processing apparatus comprising:
first processing circuitry configured to:
receive a digital broadcast signal via an antenna;
perform a demodulation process on the digital broadcast signal to obtain reception data;
generate notification data to be transmitted to second processing circuitry, the notification data indicating errors or successes of various stages of the demodulation process performed by the first processing circuitry or a setting of the first processing circuitry for performing the demodulation process;
generate a data packet that encapsulates the reception data and the notification data; and
output the generated data packet that encapsulates the reception data and the notification data to the second processing circuitry via an interface for further processing of the reception data,
wherein
the data processing apparatus that includes the first processing circuitry corresponds to an information processing apparatus that delivers content acquired from the digital broadcast signal,
the second processing circuitry corresponds to a terminal apparatus that reproduces the content delivered from the information processing apparatus,
the information processing apparatus and the terminal apparatus are configured as separate apparatuses and connected via a network as the interface,
the digital broadcast signal supports an Internet Protocol (IP) transport scheme using an IP packet including a User Datagram Protocol (UDP) packet, and
the first processing circuitry is further configured to
convert a packet holding the reception data and a packet holding the notification data into an IP packet as the generated data packet, and
send the IP packet to the second processing circuitry via the network.

14. The data processing apparatus of claim 13, wherein
the data packet complies with a digital broadcasting standard for carrying the reception data, and
the first processing circuitry is configured to generate the data packet by adding the notification data to an area in the data packet reserved in advance according to the digital broadcasting standard.

15. The data processing apparatus of claim 14, wherein
the first processing circuitry is configured to add the notification data together with identification information that can identify the notification data to the area in the data packet.

16. The data processing apparatus of claim 13, wherein
the notification data includes at least one of tuning information used during tuning, information regarding state of the demodulation process, information regarding error of the demodulation process, information regarding signaling acquired by the demodulation process, and information regarding modulation parameters.

17. The data processing apparatus of claim 13, wherein
the notification data is placed in a packet extension area of the data packet that holds the reception data.

* * * * *